US012647170B2

(12) United States Patent

Matsumura et al.

(10) Patent No.: US 12,647,170 B2

(45) Date of Patent: Jun. 2, 2026

(54) TERMINAL, RADIO COMMUNICATION METHOD, BASE STATION, AND SYSTEM

(71) Applicant: NTT DOCOMO, INC., Tokyo (JP)

(72) Inventors: Yuki Matsumura, Tokyo (JP); Satoshi Nagata, Tokyo (JP); Weiqi Sun, Beijing (CN); Shaozhen Guo, Beijing (CN); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 88 days.

(21) Appl. No.: 18/902,056

(22) Filed: Sep. 30, 2024

(65) Prior Publication Data

US 2025/0023617 A1 Jan. 16, 2025

Related U.S. Application Data

(63) Continuation of application No. 17/908,816, filed as application No. PCT/JP2020/009749 on Mar. 6, 2020, now abandoned.

(51) Int. Cl.
|  |  |
|---|---|
| *H04B 7/0404* | (2017.01) |
| *H04B 7/06* | (2006.01) |
| *H04B 7/08* | (2006.01) |

(52) U.S. Cl.
CPC ............. *H04B 7/0691* (2013.01); *H04B 7/08* (2013.01)

(58) Field of Classification Search
CPC .... H04B 7/0404; H04B 7/0456; H04B 7/088; H04B 7/06; H04B 7/0639; H04B 7/024; H04B 7/06956; H04B 7/0626; H04B 7/0695; H04W 72/232; H04W 72/1268; H04W 72/21; H04W 16/28; H04W 72/231; H04W 72/23; H04W 52/146; H04W 72/0446; H04W 72/044; H04W 52/365;

(Continued)

(56) References Cited

U.S. PATENT DOCUMENTS

| | | | | |
|---|---|---|---|---|
| 11,522,594 B2 * | 12/2022 | Liu | ........................ | H04B 7/063 |
| 12,520,295 B2 * | 1/2026 | Cirik | ................... | H04W 72/046 |

(Continued)

FOREIGN PATENT DOCUMENTS

CN 109983797 A 7/2019

OTHER PUBLICATIONS

Office Action issued in Chinese Application No. 202080098170.1, mailed May 30, 2024 (21 pages).

(Continued)

*Primary Examiner* — Eva Y Puente

(74) *Attorney, Agent, or Firm* — Osha Bergman Watanabe & Burton LLP

(57) ABSTRACT

A terminal is disclosed including a receiver that receives a first downlink control information (DCI) for scheduling a first Physical Uplink Shared Channel (PUSCH) and receives a second DCI for scheduling a second PUSCH; and a processor that controls, based on the first DCI and the second DCI, simultaneous transmission of the first PUSCH and the second PUSCH by using a first panel and a second panel, wherein when group-based beam reporting is configured, each of the first panel and the second panel corresponds to each respective group of the group-based beam reporting. In other aspects, a radio communication method, a base station, and a system are also disclosed.

5 Claims, 21 Drawing Sheets

```
panelConfig ::=        SEQUENCE {
    panelToActivate ::=            SEQUENCE OF PanelID
    panelToDeactivate ::=          SEQUENCE OF PanelID
}
```

(58) Field of Classification Search
CPC .............. H04W 52/42; H04W 72/0457; H04L
5/0051; H04L 5/0053; H04L 5/0023;
H04L 5/0094; H04L 5/0048; H04L
5/0044; H04L 5/0035; H04L 5/001; H04L
5/00
See application file for complete search history.

(56) References Cited

U.S. PATENT DOCUMENTS

| | | | |
|---|---|---|---|
| 2018/0324687 A1 | 11/2018 | Chen | |
| 2020/0367712 A1 | 11/2020 | Hanslmeier et al. | |
| 2020/0373988 A1 | 11/2020 | Wang et al. | |
| 2021/0050666 A1 | 2/2021 | Cirik et al. | |
| 2021/0168714 A1 | 6/2021 | Guan et al. | |
| 2022/0095235 A1 | 3/2022 | Zhang et al. | |
| 2022/0123818 A1 | 4/2022 | Li | |
| 2022/0217746 A1* | 7/2022 | Kang | H04B 7/0404 |
| 2022/0337302 A1 | 10/2022 | Guan et al. | |
| 2022/0369230 A1 | 11/2022 | Venugopal et al. | |
| 2023/0309080 A1 | 9/2023 | Cirik et al. | |
| 2024/0340816 A1* | 10/2024 | Cirik | H04W 56/0005 |
| 2024/0357600 A1* | 10/2024 | Cirik | H04W 52/0206 |
| 2025/0023617 A1* | 1/2025 | Matsumura | H04B 7/08 |
| 2025/0294547 A1* | 9/2025 | Sun | H04B 7/0408 |

OTHER PUBLICATIONS

China Telecom: "Enhancements on multi-beam operation", 3GPP TSG RAN WG1 #98 R1-1908886; Prague, CZ, Aug. 26-30, 2019 (5 pages).

International Search Report issued in PCT/JP2020/009749 on Oct. 6, 2020 (1 page).

Written Opinion of the International Searching Authority issued in PCT/JP2020/009749 on Oct. 6, 2020 (4 pages).

LG Electronics; "Feature lead summary#4 of Enhancements on Multi-beam Operations"; 3GPP TSG RAN WG1 Meeting #98, R1-1909779; Prague, CZ; Aug. 26-30, 2019 (38 pages).

ZTE; "Enhancements on multi-beam operation"; 3GPP TSG RAN WG1 Meeting #98, R1-1908192; Prague, CZ; Aug. 26-30, 2019 (26 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

FIG. 1A

```
panelConfig ::=            SEQUENCE {
    panelToActivate ::=             SEQUENCE OF PanelID
    panelToDeactivate ::=            SEQUENCE OF PanelID
}
```

FIG. 1B

```
panelConfig ::=            SEQUENCE {
    panelID
    status          CHOICE {
        activated
        deactivated
    }
}
```

FIG. 2A

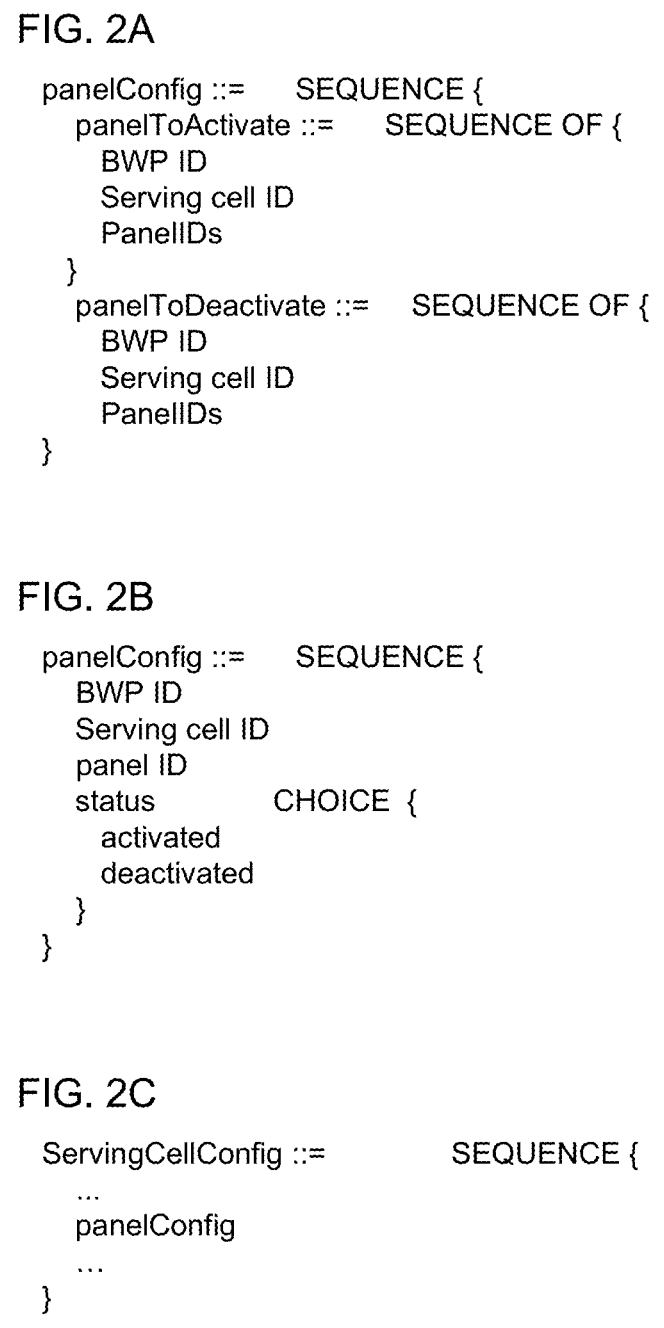

```
panelConfig ::=     SEQUENCE {
   panelToActivate ::=     SEQUENCE OF {
      BWP ID
      Serving cell ID
      PanelIDs
  }
   panelToDeactivate ::=     SEQUENCE OF {
      BWP ID
      Serving cell ID
      PanelIDs
  }
```

FIG. 2B

```
panelConfig ::=     SEQUENCE {
   BWP ID
   Serving cell ID
   panel ID
   status          CHOICE {
      activated
      deactivated
   }
}
```

FIG. 2C

```
ServingCellConfig ::=          SEQUENCE {
   ...
   panelConfig
   ...
}
```

ACTIVATION/DEACTIVATION
MAC CE

| R | SERVING CELL ID | | | | BWP ID | | | OCTET 1 |
| $A_7$ | $A_6$ | $A_5$ | $A_4$ | $A_3$ | $A_2$ | $A_1$ | $A_0$ | OCTET 2 |

ACTIVATION/DEACTIVATION
MAC CE

| A/D | SERVING CELL ID | BWP ID | OCTET 1 |
| PANEL ID | | | OCTET 2 |

ACTIVATION/DEACTIVATION
MAC CE

| R | LIST ID | | | | | | | OCTET 1 |
|---|---|---|---|---|---|---|---|---|
| $A_7$ | $A_6$ | $A_5$ | $A_4$ | $A_3$ | $A_2$ | $A_1$ | $A_0$ | OCTET 2 |

ACTIVATION/DEACTIVATION
MAC CE

| A/D | LIST ID | OCTET 1 |
|---|---|---|
| PANEL ID | | OCTET 2 |

RSRP OF EACH BEAM

PANEL #1

PANEL #2

DEACTIVATION CRITERION 1-1,
THRESHOLD VALUE = 15
PANEL #1 IS TO BE ACTIVATED
PANEL #2 IS TO BE DEACTIVATED

DEACTIVATION CRITERION 1-2, X = 2,
THRESHOLD VALUE = 15
PANEL #1 IS TO BE DEACTIVATED
PANEL #2 IS TO BE ACTIVATED

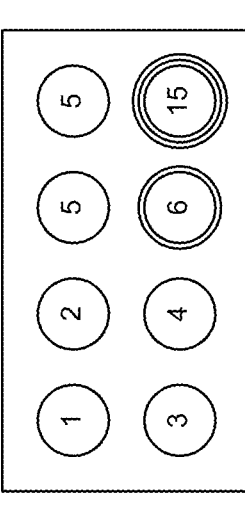

RSRP OF EACH BEAM

PANEL #1

PANEL #2

PANEL #3

INITIAL STATE
PANEL #1 IS DEACTIVATED
PANELS #2 AND #3 ARE ACTIVATED

ACTIVATION CRITERION 1-3,
THRESHOLD VALUE = 11
PANEL #1 IS TO BE ACTIVATED

ACTIVATION CRITERION 1-4, X = 2,
THRESHOLD VALUE = 11
PANEL #1 IS TO BE DEACTIVATED

ACTIVATION CRITERION 1-5, N = 1
PANEL #1 IS TO BE ACTIVATED

ACTIVATION CRITERION 1-5, N = 2
PANEL #1 IS TO BE DEACTIVATED

ACTIVATION CRITERION 1-6, X = 2, N = 1
PANEL #1 IS TO BE DEACTIVATED

FIG. 7

RSRP OF EACH BEAM

PANEL #1

PANEL #2

INITIAL STATE
PANEL #1 IS DEACTIVATED
PANELS #2 IS ACTIVATED

ACTIVATION CRITERION 1-7
THRESHOLD VALUE = 14
PANEL #1 IS TO BE ACTIVATED

ACTIVATION CRITERION 1-8, X = 2,
THRESHOLD VALUE = 14
PANEL #1 IS TO BE DEACTIVATED

| ASSUMPTION | | OPERATION | UE OPERATION USING DEACTIVATED PANEL | | | |
|---|---|---|---|---|---|---|
| | | | CSI-RS | PDCCH/ PDSCH | SRS | PUCCH/ PUSCH |
| 3-1 (SEPA- RATELY) | DEACTIVATED PANEL FOR DL RECEPTION | 1-1 | × | × | NA | NA |
| | | 1-2 | ✓ | × | NA | NA |
| | DEACTIVATED PANEL FOR UL TRANSMISSION | 2-1 | NA | NA | × | × |
| | | 2-2 | NA | NA | ✓ | × |
| 3-2 (JOINTLY) | DEACTIVATED PANEL FOR DL RECEPTION AND UL TRANSMISSION | 3-1 | × | × | × | × |
| | | 3-2 | ✓ | × | × | × |
| | | 3-3 | × | × | ✓ | × |
| | | 3-4 | ✓ | × | ✓ | × |

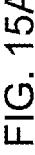

START TIMER

RESTART TIMER

TIMER EXPIRATION AND
DEACTIVATION OF PANEL #0

PANEL #0

TIME

RRC CONFIGURATION

SCHEDULING OF
DYNAMIC PDSCH
USING PANEL #0

NOT TO RECEIVE
SCHEDULING GRANT OF
PDSCH USING PANEL #0

FIG. 15B

START TIMER

RESET AND STOP TIMER

TIMER EXPIRATION AND
DEACTIVATION OF PANEL #0

PANEL #0

TIME

RRC CONFIGURATION

ACTIVATION OF SPS OF
PDSCH USING PANEL #0

START TIMER

DEACTIVATION OF SPS
USING PANEL #0

NOT TO RECEIVE
SCHEDULING GRANT OF
PDSCH USING PANEL #0

10, 20

1

TERMINAL, RADIO COMMUNICATION METHOD, BASE STATION, AND SYSTEM

CROSS-REFERENCE TO RELATED APPLICATIONS

The present application is a continuation application and, thereby, claims benefit under 35 U.S.C. § 120 to U.S. patent application Ser. No. 17/908,816 filed on Sep. 1, 2022, titled, "TERMINAL, RADIO COMMUNICATION METHOD, AND BASE STATION," which is a national stage application of PCT Application No. PCT/JP2020/009749, filed on Mar. 6, 2020. The contents of the priority applications are incorporated by reference in their entirety.

TECHNICAL FIELD

The present disclosure relates to a terminal, a radio communication method, a base station, and a system in next-generation mobile communication systems.

BACKGROUND ART

In the universal mobile telecommunications system (UMTS) network, the specifications of long term evolution (LTE) have been drafted for the purpose of further increasing high speed data rates, providing lower delays, and so on (see Non Patent Literature 1). In addition, the specifications of LTE-Advanced (third generation partnership project (3GPP) Release (Rel) 10 to 14) have been drafted for the purpose of further increasing capacity and advancement of LTE (3GPP Rel. 8 and 9).

Successor systems to LTE (for example, also referred to as 5th generation mobile communication system (5G), 5G+ (plus), 6th generation mobile communication system (6G), New Radio (NR), or 3GPP Rel. 15 or later) are also being studied.

In the existing LTE systems (for example, 3GPP Rel. 8 to 14), a user terminal (user equipment (UE)) uses at least one of a UL data channel (for example, physical uplink shared channel (PUSCH)) or a UL control channel (for example, physical uplink control channel (PUCCH)) to transmit uplink control information (UCI).

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

In future radio communication systems (e.g., NR), the UE is considered to determine DL reception beams (spatial domain reception filters) and UL transmission beams (spatial domain transmission filters) based on information notified by the base station. In addition, it has been considered that the UE performs DL reception and UL transmission using a plurality of UE panels (panel, antenna panel).

However, it is not clear how the UE activates/deactivates the plurality of panels. If the plurality of panels cannot be appropriately used, system performance may be degraded, such as an increase in power consumption and a decrease in beam gain.

Therefore, an object of the present disclosure is to provide a terminal, a radio communication method, and a base station that appropriately use a plurality of panels.

Solution to Problem

A terminal according to an aspect of the present disclosure includes a receiving section that receives information related to activation or deactivation of at least one of a plurality of panels, and a control section that uses one of the plurality of panels to transmit or receive a specific signal on the basis of the information.

Advantageous Effects of Invention

According to one aspect of the present disclosure, a plurality of panels can be appropriately used.

BRIEF DESCRIPTION OF DRAWINGS

FIGS. 1A and 1B are diagrams illustrating an example of RRC IE of panel configuration.

FIGS. 2A to 2C are diagrams illustrating another example of RRC IE of panel configuration.

FIG. 7 is a diagram illustrating an example of panel activation/deactivation based on an activation criterion 1.

FIG. 10 is a diagram illustrating an example of UE operation using a deactivated panel.

FIGS. 15A and 15B are diagrams illustrating another example of the deactivation method 2-1.

Figure 3A:
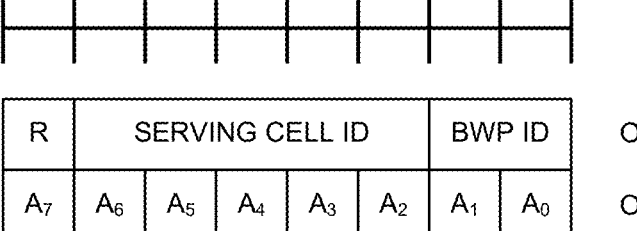
FIGS. 3A and 3B are diagrams illustrating an example of panel activation/deactivation MAC CE.

DESCRIPTION OF EMBODIMENTS (TCI, Spatial Relation, and QCL)

In NR, it has been studied to control reception processing (for example, at least one of reception, demapping, demodulation, and decoding) and transmission processing (for example, at least one of transmission, mapping, precoding, modulation, and coding) in UE of at least one of a signal and a channel (expressed as a signal/channel) based on a transmission configuration indication state (TCI state).

The TCI state may represent what is applied to a downlink signal/channel. One corresponding to the TCI state applied to an uplink signal/channel may be expressed as a spatial relation.

The TCI state is information regarding a quasi-co-location (QCL) of the signal/channel, and may also be referred to as, for example, a spatial Rx parameter, spatial relation information, or the like. The TCI state may be configured in the UE for each channel or each signal.

In the present disclosure, a TCI state of DL may be replaced with a spatial relation of UL, a TCI state of UL, or the like.

QCL is an index indicating a statistical property of a signal/channel. For example, a case where one signal/channel and another signal/channel have a QCL relation may mean that it is possible to assume that at least one of Doppler shift, Doppler spread, an average delay, a delay spread, and a spatial parameter (for example, a spatial Rx parameter) is identical (in QCL with respect to at least one of these) between the plurality of different signals/channels.

Note that the spatial Rx parameter may correspond to a reception beam of UE (e.g., reception analog beam), and the beam may be identified based on spatial QCL. QCL (or at least one element of QCL) in the present disclosure may be replaced with spatial QCL (SQCL).

A plurality of types (QCL types) of QCL may be defined. For example, four QCL types A to D with different parameters (or parameter sets) that can be assumed to be identical may be provided. These parameters (which may be referred to as QCL parameters) are as follows:

QCL type A (QCL-A): Doppler shift, Doppler spread, average delay, and delay spread;

QCL type B (QCL-B): Doppler shift and Doppler spread;

QCL type C (QCL-C): Doppler shift and average delay; and

QCL type D (QCL-D): spatial Rx parameter.

It may be referred to as a QCL assumption for the UE to assume that a certain control resource set (CORESET), channel, or reference signal has a specific QCL (for example, QCL type D) relation with another CORESET, channel, or reference signal.

The UE may determine at least one of a Tx beam (Tx beam) and a reception beam (Rx beam) of a signal/channel based on a TCI state of the signal/channel or the QCL assumption.

The TCI state may be, for example, information regarding the QCL of a target channel (In other words, a reference signal (Reference Signal (RS)) for the channel) and another signal (for example, another RS). The TCI state may be configured (indicated) by higher layer signaling, physical layer signaling, or a combination thereof.

In the present disclosure, the higher layer signaling may be any of, for example, radio resource control (RRC) signaling, medium access control (MAC) signaling, broadcast information, and the like, or a combination thereof.

The MAC signaling may use, for example, a MAC control element (MAC CE), a MAC protocol data unit (PDU), and the like. The broadcast information may be, for example, a master information block (MIB), a system information block (SIB), remaining minimum system information (RMSI), other system information (OSI), and the like.

The physical layer signaling may be, for example, downlink control information (DCI).

A channel for which a TCI state or spatial relation is configured (specified) may be, for example, at least one of a Physical Downlink Shared Channel (PDSCH), a Physical Downlink Control Channel (PDCCH), a Physical Uplink Shared Channel (PUSCH), and a Physical Uplink Control Channel (PUCCH).

Furthermore, an RS having a QCL relation with the channel may be, for example, at least one of a Synchronization Signal Block (SSB), a Channel State Information Reference Signal (CSI-RS)), a measurement reference signal (Sounding Reference Signal (SRS)), a tracking CSI-RS (also referred to as a Tracking Reference Signal (TRS)), and a QCL detection reference signal (also referred to as a QRS).

The SSB is a signal block including at least one of a Primary Synchronization Signal (PSS), a Secondary Synchronization Signal (SSS), or a Physical Broadcast Channel (PBCH). The SSB may be referred to as an SS/PBCH block.

The UE may receive, by higher layer signaling, configuration information (for example, PDSCH-Config, tci-StatesToAddModList) including a list of information elements of the TCI state.

An information element of a TCI state configured by higher layer signaling ("TCI-state IE" of RRC) may include a TCI state ID and one or more pieces of QCL information (one or more QCL information, "QCL-Info"). The QCL Information may include at least one of information regarding the RS having the QCL relation (RS related information) and information indicating a QCL type (QCL type information). The RS related information may include information such as an index of the RS (for example, an SSB index or a non-zero-power (NZP) CSI-RS resource identifier (ID)), an index of a cell where the RS is located, or an index of a bandwidth part (BWP) where the RS is located.

In Rel. 15 NR, both an RS of the QCL type A and an RS of the QCL type D, or only the RS of the QCL type A may be configured for the UE as a TCI state of at least one of the PDCCH or the PDSCH.

When the TRS is set as the RS of the QCL type A, in the TRS, different from a Demodulation Reference Signal (DMRS) of the PDCCH or the PDSCH, it is assumed that the same TRS is periodically transmitted for a long time. The UE can measure the TRS and calculate an average delay, a delay spread, and the like.

In the UE for which the TRS is configured as the RS of the QCL type A in the TCI state of the DMRS of the PDCCH or the PDSCH, it can be assumed that parameters (the average delay, the delay spread, and the like) of the QCL type A are the same between the DMRS of the PDCCH or the PDSCH and the TRS, and thus, the parameters (the average delay, the delay spread, and the like) of the type A of the DMRS of the PDCCH or the PDSCH can be obtained from a measurement result of the TRS. When performing channel estimation of at least one of the PDCCH or the PDSCH, the UE can perform channel estimation with higher accuracy using the measurement result of the TRS.

The UE for which the RS of the QCL type D is configured can determine a UE reception beam (spatial domain reception filter, UE spatial domain reception filter) by using the RS of the QCL type D.

An RS of QCL type X in a TCI state may mean an RS in a QCL type X relation with (DMRS of) a certain channel/ signal, and this RS may be referred to as a QCL source of QCL type X in the TCI state.

<TCI State for PDCCH>

Information about the QCL between the PDCCH (or the DMRS antenna port associated with the PDCCH) and a certain RS may be referred to as a TCI state or the like for the PDCCH.

The UE may determine a TCI state for a UE-specific PDCCH (CORESET) on the basis of higher layer signaling. For example, for the UE, one or a plurality of (K) TCI states may be configured by RRC signaling for each CORESET.

In the UE, one of the plurality of TCI states configured by the RRC signaling may be activated by a MAC CE, for each CORESET. The MAC CE may be referred to as a TCI state indication MAC CE for a UE specific PDCCH (TCI State Indication for UE-specific PDCCH MAC CE). The UE may monitor a CORESET on the basis of an active TCI state corresponding to the CORESET.

<TCI State for PDSCH>

The information about the QCL between the PDSCH (or the DMRS antenna port related to the PDSCH) and a DL-RS may be referred to as a TCI state for the PDSCH or the like.

The UE may notify (configure) M (M≥1) TCI states for PDSCH (QCL information for M PDSCHs) by higher layer signaling. Note that the number M of TCI states configured in the UE may be limited by at least one of the UE capability and the QCL type.

DCI used for PDSCH scheduling may include a field (which may be referred to as, for example, a TCI field, a TCI state field, or the like) indicating a TCI state for the PDSCH. The DCI may be used for scheduling the PDSCH of one cell, and may be referred to as, for example, DL DCI, DL assignment, DCI format 1_0, DCI format 1_1, or the like.

Whether or not the TCI field is included in the DCI may be controlled by information of which the UE is notified from the base station. The information may be information (for example, TCI existence information, TCI existence information in DCI, higher layer parameter TCI-PresentIn-DCI) indicating whether the TCI field is present or absent in the DCI. The information may be configured in the UE by, for example, higher layer signaling.

When more than eight types of TCI states are configured in the UE, MAC CE may be used to activate (or specify) eight or less types of TCI states. The MAC CE may be referred to as a TCI state activation/deactivation MAC CE for UE specific PDSCH (TCI States Activation/Deactivation for UE-specific PDSCH MAC CE). A value of the TCI field in the DCI may indicate one of the TCI states activated by MAC CE.

In a case where the TCI presence information configured as "enabled" is configured in the UE for a CORESET for scheduling a PDSCH (CORESET used for PDCCH transmission for scheduling the PDSCH), the UE may assume that the TCI field is present in the DCI format 1_1 of the PDCCH transmitted on the CORESET.

In a case where the TCI presence information is not configured for the CORESET for scheduling a PDSCH, or the PDSCH is scheduled by the DCI format 1_0, in a case where a time offset between reception of DL DCI (DCI for scheduling the PDSCH) and reception of a PDSCH corresponding to the DCI is greater than or equal to a threshold value, the UE, to determine QCL of a PDSCH antenna port, may assume that a TCI state or a QCL assumption for the PDSCH is the same as a TCI state or a QCL assumption applied to a CORESET used for PDCCH transmission for scheduling the PDSCH.

When the TCI existence information is set to "enabled", the TCI field in the DCI in the component carrier (CC) scheduling (PDSCH) indicates the activated TCI state in the scheduled CC or DL BWP, and when the PDSCH is scheduled according to DCI format 1_1, the UE may use the TCI with the DCI and according to the value of the TCI field in the detected PDCCH to determine the QCL of the PDSCH antenna port. When the time offset between the reception of the DL DCI (scheduling the PDSCH) and the PDSCH corresponding to the DCI (PDSCH scheduled by the DCI) is greater than or equal to the threshold value, the UE may assume that the DM-RS port of the PDSCH of the serving cell is the RS and QCL in the TCI state with respect to the QCL type parameter given by the indicated TCI state.

If the UE is configured with a single-slot PDSCH, the indicated TCI state may be based on the activated TCI state in the slot with the scheduled PDSCH. If the UE is configured with a multi-slot PDSCH, the indicated TCI state may be based on the activated TCI state in the first slot with the scheduled PDSCH and the UE may expect to be identical across the slots with the scheduled PDSCH. When the UE is configured with a CORESET associated with a search space set for cross-carrier scheduling, the UE may assume that for the CORESET, the TCI existence information is set to "enabled", and when at least one of the TCI states configured for the serving cell scheduled by the search space set includes a QCL type D, the UE may assume that a time offset between the detected PDCCH and a PDSCH corresponding to the PDCCH is greater than or equal to the threshold value.

In both a case where the TCI information in the DCI (higher layer parameter TCI-PresentInDCI) is set to "enabled" and a case where the TCI information in the DCI is not configured in the RRC connection mode, when the time offset between reception of DL DCI (DCI for scheduling the PDSCH) and the corresponding PDSCH (PDSCH scheduled by the DCI) is less than the threshold value, the UE may assume that the DM-RS port of the PDSCH of the serving cell has a minimum (lowest) CORESET-ID in a newest (latest) slot in which one or more CORESETs in an active BWP of the serving cell are monitored by the UE, and is in QCL with the RS related to a QCL parameter used for QCL indication of the PDCCH of the CORESET associated with a monitored search space. This RS may be referred to as a default TCI state of the PDSCH or a default QCL assumption of the PDSCH.

The time offset between the reception of the DL DCI and the reception of the PDSCH corresponding to the DCI may be referred to as a scheduling offset.

Furthermore, the threshold value may be referred to as a time duration for QCL, "timeDurationForQCL", "Threshold", "Threshold for offset between a DCI indicating a TCI state and a PDSCH scheduled by the DCI", "Threshold-Sched-Offset", a schedule offset threshold, a scheduling offset threshold, or the like.

The QCL time length may be based on UE capability, for example, may be based on a delay required for decoding and beam switching of the PDCCH. The time length for QCL may be the minimum time required for the UE to perform PDCCH reception and application of spatial QCL information received in the DCI for PDSCH processing. The QCL time length may be represented by the number of symbols for each subcarrier interval or may be represented by time (for example, μs). The information of the QCL time length may be reported from the UE to the base station as UE capability information, or may be configured from the base station to the UE using higher layer signaling.

For example, the UE may assume that the DMRS ports of the PDSCH are DL-RS and QCL based on the activated TCI state for the CORESET corresponding to the smallest CORESET-ID. The latest slot may be, for example, a slot for receiving DCI for scheduling the PDSCH.

Note that the CORESET-ID may be an ID (ID for CORESET identification, controlResourceSetId) set by the RRC information element "ControlResourceSet".

When no CORESET is set for a CC, the default TCI state may be an activated TCI state applicable to the PDSCH in the active DL BWP for the CC and having the lowest ID.

After Rel. 16, if the PDSCH and the PDCCH scheduling the PDSCH are in different component carriers (CCs) (cross-carrier scheduling), if the delay from the PDCCH to the PDSCH (PDCCH-to-PDSCH delay) is shorter than the QCL time length, or if the TCI state is not in the DCI for the scheduling, the UE may obtain a QCL assumption for the scheduled PDSCH from the active TCI state applicable to the PDSCH in the active BWP for the scheduled cell and having the lowest ID.

<Spatial Relation for PUCCH>

The UE may set a parameter (PUCCH configuration information, PUCCH-Config) used for PUCCH transmission by higher layer signaling (for example, Radio Resource Control (RRC) signaling). The PUCCH setting information may be set for each partial band (for example, an uplink bandwidth part (Bandwidth Part (BWP))) in the carrier (Also referred to as a cell and a component carrier (CC)).

The PUCCH configuration information may include a list of PUCCH resource set information (for example, PUCCH-ResourceSet) and a list of PUCCH spatial relation information (for example, PUCCH-SpatialRelationInfo).

The PUCCH resource set information may include a list (for example, resourceList) of PUCCH resource indices (ID, e.g., PUCCH-ResourceId).

Furthermore, when the UE does not have a dedicated PUCCH resource configuration information (for example, a dedicated PUCCH resource configuration) provided by the PUCCH resource set information in the PUCCH configuration information (before RRC setup), the UE may determine a PUCCH resource set based on a parameter (for example, pucch-ResourceCommon) in the system information (for example, System Information Block Type 1 (SIB1) or Remaining Minimum System Information (RMSI)). The PUCCH resource set may include 16 PUCCH resources.

On the other hand, when the UE has the dedicated PUCCH resource configuration information (UE-Specific Uplink Control Channel Configuration, Dedicated PUCCH Resource Configuration) (after RRC setup), the UE may determine the PUCCH resource set according to the number of UCI information bits.

The UE may determine one PUCCH resource (index) in the PUCCH resource set (for example, a cell-specific PUCCH resource set or a PUCCH resource set determined for individual UE) based on at least one of a value of a field (for example, a PUCCH resource indicator field) in Downlink Control Information (DCI) (for example, the DCI format 1_0 or 1_1 used for PDSCH scheduling), the number of CCEs (NCCE) in a control resource set (control resource set (CORESET)) for reception of a PDCCH that carries the DCI, or an index ($n_{CCE,0}$) of a head (first) CCE of the reception of the PDCCH.

The PUCCH spatial relation information (for example, "PUCCH-spatialRelationInfo" of the RRC information element) may indicate a plurality of candidate beams (spatial domain filters) for PUCCH transmission. The PUCCH spatial relation information may indicate a spatial relation between a reference signal (RS) and a PUCCH.

The list of PUCCH spatial relation information may include several elements (PUCCH spatial relation information IE (Information Element)). Each piece of PUCCH spatial relation information may include, for example, at least one of an index (ID, e.g., pucch-SpatialRelationInfoId) of PUCCH spatial relation information, an index (ID, e.g., servingCellId) of a serving cell, and information related to an RS (reference RS) that is a spatial relation with the PUCCH.

For example, the information regarding the RS may be the SSB index, the CSI-RS index (for example, the NZP-CSI-RS resource configuration ID), or the SRS resource ID and the ID of the BWP. The SSB index, the CSI-RS index, and the SRS resource ID may be associated with at least one of a beam, a resource, and a port selected by measurement of a corresponding RS.

If more than one piece of spatial relation information about the PUCCH is configured, the UE may control, based on a PUCCH spatial relation activation/deactivation MAC CE (PUCCH spatial relation Activation/Deactivation MAC CE), that one piece of PUCCH spatial relation information is active for one PUCCH resource at a certain time.

The PUCCH spatial relation activation/deactivation MAC CE of Rel-15 NR is expressed by a total of 3 octets (8 bits×3=24 bits) of octets (Octet, Oct) 1-3.

The MAC CE may include information such as an application target serving cell ID ("Serving Cell ID" field), a BWP ID ("BWP ID" field), and a PUCCH resource ID ("PUCCH Resource ID" field).

Furthermore, the MAC CE includes a field of "$S_i$" (i=0-7). When a field of a certain $S_i$ indicates 1, the UE activates spatial relation information of a spatial relation information ID #i. When a field of a certain $S_i$ indicates 0, the UE deactivates the spatial relation information of the spatial relation information ID #i.

The UE may activate PUCCH relation information specified by a MAC CE 3 ms after transmitting an acknowledgment (ACK) for the MAC CE activating PUCCH spatial relation information.

<Spatial Relation for SRS and PUSCH>

The UE may receive information (SRS configuration information, for example, a parameter in "SRS-Config" of the RRC control element) used for transmission of a measurement reference signal (for example, a sounding reference signal (Sounding Reference Signal (SRS))).

Specifically, the UE may receive at least one of information related to one or a plurality of SRS resource sets (SRS resource set information, for example, "SRS-ResourceSet" of the RRC control element) and information related to one or a plurality of SRS resources (SRS resource information, for example, "SRS-Resource" of the RRC control element).

One SRS resource set may be associated with several number of SRS resources (several number of SRS resources may be grouped). Each SRS resource may be specified by an SRS resource identifier (SRS Resource Indicator (SRI)) or an SRS resource ID (Identifier).

The SRS resource set information may include an SRS resource set ID (SRS-ResourceSetId), a list of SRS resource IDs (SRS-ResourceId) used in the resource set, an SRS resource type, and information of usage of the SRS.

Here, the SRS resource type may indicate any of periodic SRS (Periodic SRS (P-SRS)), semi-persistent SRS (Semi-Persistent SRS (SP-SRS)), and aperiodic SRS (Aperiodic SRS (A-SRS, AP-SRS)). The UE may periodically (or periodically after activation) transmit the P-SRS and the SP-SRS, and transmit the A-SRS based on the SRS request of the DCI.

In addition, the application ("usage" of the RRC parameter and "SRS-SetUse" of the L1 (Layer-1) parameter) may be, for example, beam management (beamManagement), codebook-based transmission (codebook: CB), noncodebook-based transmission (nonCodebook: NCB), antenna switching (antennaSwitching), or the like. The SRS for codebook-based or noncodebook-based transmission applications may be used to determine precoders for codebook-based or noncodebook-based PUSCH transmissions based on SRI.

For example, the UE may determine a precoder for PUSCH transmission based on an SRI, a transmitted rank indicator (TRI) and a transmitted precoding matrix indicator (TPMI) for codebook-based transmission. The UE may determine the precoder for the PUSCH transmission based on the SRI, for the non-codebook-based transmission.

The SRS resource information may include an SRS resource ID (SRS-ResourceId), the number of SRS ports, an SRS port number, a transmission Comb, an SRS resource mapping (for example, time and/or frequency resource location, resource offset, cycle of resource, number of repetitions, number of SRS symbols, SRS bandwidth, etc.), hopping-related information, an SRS resource type, a sequence ID, spatial relation information of an SRS, and the like.

The spatial relation information (for example, "spatial-RelationInfo" of the RRC information element) of the SRS may indicate spatial relation information between a certain reference signal and the SRS. The reference signal may be at least one of a Synchronization Signal/Physical Broadcast Channel (SS/PBCH) block, a Channel State Information Reference Signal (CSI-RS), or and SRS (for example, another SRS). The SS/PBCH block may be referred to as a synchronization signal block (SSB).

The spatial relation information of the SRS may include at least one of an SSB index, a CSI-RS resource ID, and an SRS resource ID as an index of the reference signal.

Note that, in the present disclosure, an SSB index, an SSB resource ID, and an SSB resource indicator (SSBRI) may be replaced with each other. Further, a CSI-RS index, a CSI-RS resource ID, and a CRI (CSI-RS Resource Indicator) may be replaced with each other. Further, an SRS index, an SRS resource ID, and an SRI may be replaced with each other.

The spatial relation information of the SRS may include a serving cell index, a BWP index (BWP ID), and the like corresponding to the reference signal.

In the NR, the transmission of the uplink signal may be controlled based on the presence or absence of beam correspondence (BC). The BC may be, for example, a capability of a certain node (for example, a base station or UE) to determine a beam (Reception beam, Rx beam) used for signal transmission based on a beam (Transmission beam, Tx beam) used for signal reception.

Note that the BC may be referred to as transmission/reception beam correspondence (Tx/Rx beam correspondence), beam reciprocity, beam calibration, calibrated/non-calibrated, reciprocity calibrated/non-calibrated, correspondence degree, matching degree, or the like.

For example, when there is no BC, the UE may transmit the uplink signal (for example, PUSCH, PUCCH, SRS, and the like) using the same beam (spatial domain transmission filter) as the SRS (or the SRS resource) indicated from the base station based on the measurement results of one or more SRSs (or the SRS resource).

On the other hand, in the case of the presence of BC, the UE may transmit the uplink signal (for example, PUSCH, PUCCH, SRS, and the like) using a beam (spatial domain transmission filter) that is the same as or corresponding to a beam (spatial domain reception filter) used to receive a SSB or CSI-RS (or CSI-RS resource).

When the spatial relation information related to the SSB or the CSI-RS and the SRS is set for a certain SRS resource (for example, in the case of the presence of BC), the UE may transmit the SRS resource using the same spatial domain filter (spatial domain transmission filter) as the spatial domain filter (spatial domain reception filter) for receiving the SSB or the CSI-RS. In this case, the UE may assume that the UE reception beam of the SSB or CSI-RS and the UE transmission beam of the SRS are the same.

When the spatial relation information about another SRS (reference SRS) and the SRS (target SRS) is set for a certain SRS (target SRS) resource (for example, in the case of no BC), the UE may transmit the target SRS resource using the same spatial domain filter (spatial domain transmission filter) as the spatial domain filter (spatial domain transmission filter) for transmission of the reference SRS. That is, in this case, the UE may assume that the UE transmission beam of the reference SRS and the UE transmission beam of the target SRS are the same.

The UE may determine the spatial relation of the PUSCH scheduled by the DCI based on a value of a field (for example, the SRS resource identifier (SRI) field) in the DCI (for example, DCI format 0_1). Specifically, the UE may use the spatial relation information (for example, "spatialRelationInfo" of the RRC information element) of the SRS resource determined based on the value (for example, SRI) of the field for the PUSCH transmission.

When using codebook based transmission for the PUSCH, the UE may be configured with two SRS resources by the RRC and indicated with one of the two SRS resources by the DCI (1-bit field). When using non-codebook based transmission for the PUSCH, the UE may be configured with four SRS resources by the RRC and indicated with one of the four SRS resources by the DCI (2-bit field). In order to use a spatial relation other than the two or four spatial relations set by the RRC, RRC reconfiguration is required.

Note that the DL-RS can be set for the spatial relation of the SRS resource used for the PUSCH. For example, for the SP-SRS, the UE may configure a spatial relation of a plurality of (for example, up to 16) SRS resources by RRC, and one of the plurality of SRS resources may be indicated by the MAC CE.

(UE Multi-Panel)

Facilitating UL beam selection for UEs having multiple panels, based on UL beam indication using the unified transmission configuration indicator (TCI) framework for UL high speed panel selection, considering UL coverage loss due to maximum permitted exposure (MPE), has been considered.

To optimize power consumption of the UE, it is effective to deactivate a panel that is not used by the UE. In Rel. 16, the activation/deactivation of the UE panel depends on the UE implementation and is not acknowledged by the base station (for example, gNB) (transparent from the base station). There is no align mechanism that supports efficient activation/deactivation of the UE panel and aligns activation/deactivation information of the UE panel between the base station and the UE.

If the activation/deactivation of the UE panel is not appropriately performed, system performance may be degraded, such as an increase in power consumption and a decrease in beam gain.

Therefore, the present inventors conceived a method of activating/deactivating a UE panel.

Hereinafter, embodiments according to the present disclosure will be described in detail with reference to the drawings. The radio communication methods according to the embodiments may be applied alone or in combination.

In the present disclosure, "A/B" and "at least one of A or B" may be interchangeable. In the present disclosure, a cell, a CC, a carrier, a BWP, and a band may be interchangeable. In the present disclosure, an index, an ID, an indicator, and a resource ID may be interchangeable. In the present disclosure, an RRC parameter, a higher layer parameter, an RRC information element (IE), and an RRC message may be replaced with each other.

In the present disclosure, a TCI state, a QCL assumption, a QCL parameter, a spatial domain reception filter, a UE spatial domain reception filter, a UE reception beam, a DL reception beam, a DL precoding, a DL precoder, a DL-RS, an RS of QCL type D of a TCI state or a QCL assumption, and an RS of QCL type A of a TCI state or a QCL assumption may be replaced with each other. In the present disclosure, a QCL type X-RS, a DL-RS associated with QCL type X, a DL-RS with QCL type X, a source of a DL-RS, an SSB, and a CSI-RS may be replaced with each other.

In the present disclosure, a spatial relation, spatial relation information, a spatial relation assumption, a QCL parameter, a spatial domain transmission filter, a UE spatial domain transmission filter, a UE transmission beam, a UL transmission beam, a UL precoding, a UL precoder, a spatial relation RS, a DL-RS, a QCL assumption, an SRI, a spatial relation based on an SRI, and a UL TCI may be replaced with each other.

In the present disclosure, a panel, a UE panel, an antenna panel, an antenna group, a beam, and a spatial domain filter may be replaced with each other.

(Radio Communication Method)

The activation/deactivation of the UE panel may be controlled by the base station and notified (indicated, configured) to the UE. The activation/deactivation of the UE panel may be controlled by the UE and notified (reported) to the base station. The activation/deactivation of the UE panel may be reported by the UE and confirmed (approved) by the base station.

The UE may be instructed to activate/deactivate the UE panel via association between the UE panel and one or more specific signals (implicit indication).

In the present disclosure, a specific signal, a specific type of signal, a resource of the specific signal, a DL reception, a DL channel, a DL-RS, a UL transmission, a UL channel, and a UL-RS may be replaced with each other. In the present disclosure, a DL-RS and a CSI-RS may be replaced with each other. In the present disclosure, a DL channel, a PDCCH, and a PDSCH may be replaced with each other. In the present disclosure, a UL-RS and an SRS may be replaced with each other. In the present disclosure, a UL channel, a PUCCH, and a PUSCH may be replaced with each other.

In the present disclosure, activated, active, enabled, and powered on may be replaced with each other. In the present disclosure, deactivated, inactive, disabled, and powered off may be replaced with each other.

First Embodiment

The UE may be indicated/configured to activate/deactivate the UE panel. The UE may receive information regarding activation or deactivation of at least one of the plurality of UE panels. The activation/deactivation of the panel may be according to any of the following indication methods 1 to 3. Via any of the indication methods 1 to 3, DL reception and UL transmission using the panel may be separately activated/deactivated or jointly activated/deactivated.

<<Indication Method 1>>

The UE may be explicitly instructed/configured to activate/deactivate the panel via at least one of RRC signaling and MAC CE.

The indication/configuration may be according to at least one of the following indication methods 1-1 and 1-2.

[Indication Method 1-1]

The UE may be configured for panel activation/deactivation via RRC signaling.

A new RRC information element (IE) (for example, panel configuration, PanelConfig) for panel activation/deactivation may be introduced. This information may be included in an existing RRC IE.

For example, as illustrated in FIG. 1A, the panel configuration may include at least one of an ID of a panel to be activated and an ID of a panel to be deactivated. For example, as illustrated in FIG. 1B, the panel configuration may include a panel ID and a status indicating whether to be activated or deactivated.

The panel ID may be an RS group/set ID, an antenna port (group/set) ID, or another new ID.

The indication method 1-1 may be according to any one of the following indication methods 1-1a and 1-1b.

[[Indication Method 1-1a]]

For each CC/BWP, panel activation/deactivation may be configured via RRC signaling. The indication/configuration may be according to at least one of the following indication methods 1-1a-1 and 1-1a-2.

[[[Indication Method 1-1a-1]]]

The UE may be explicitly indicated with the BWP ID/serving cell ID along with the panel ID. For example, as illustrated in FIG. 2A, the panel configuration may include at least one of information of a panel to be activated and information of a panel to be deactivated, and each piece of information may include a BWP ID, a serving cell ID, and a panel ID. For example, as illustrated in FIG. 2B, the panel configuration may include a BWP ID, a serving cell ID, a panel ID, and a state.

[[[Indication Method 1-1a-2]]]

The UE may determine the BWP ID/serving cell ID from the RRC IE including the information on activation/deactivation of the panel. For example, as illustrated in FIG. 2C, the panel configuration may be included in a serving cell configuration (servingCellConfig). The activation/deactivation of the panel may be applied to the corresponding serving cell.

If group-based beam reporting (group based beam reporting (groupBasedBeamReporting)) is set, the panel ID may correspond to each group (index) of the group-based beam reporting.

[[Indication Method 1-1b]]

For each CC group/BWP group, panel activation/deactivation may be configured via RRC signaling.

[Indication Method 1-2]

The UE may be indicated to activate/deactivate the panel via the MAC CE. The indication may be according to any of the following indication methods 1-2a and 1-2b.

[[Indication Method 1-2a]]

For each CC/BWP, panel activation/deactivation may be indicated via the MAC CE. The indication may be according to any one of the following indication methods 1-2a-1 and 1-2a-2.

[[[Indication Method 1-2a-1]]]

A bitmap having one bit for each panel may be used to indicate activation/deactivation. For example, as illustrated in FIG. 3A, the MAC CE includes a field of a bitmap $A_i$. $A_i$ is used as an indication for activation/deactivation of the panel IDi. $A_i$=1 may indicate activation, and $A_i$=0 may indicate deactivation. $A_i$=0 may indicate activation, and $A_i$=1 may indicate deactivation. The MAC CE may further include at least one of a reserved bit (R) field, a serving cell ID field, and a BWP ID field. The order of the $A_i$ field may be in descending order of i or in ascending order of i.

[[[Indication Method 1-2a-2]]]

Figure 3B:
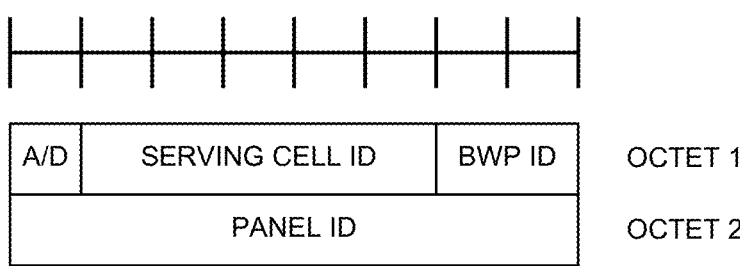

A panel ID and 1 bit may be indicated. One bit may be used to instruct activation/deactivation of the indicated panel. For example, as illustrated in FIG. 3B, the MAC CE includes a panel ID field and a 1-bit field. The 1-bit field may be referred to as an activation/deactivation (A/D) field, an activator field, or the like. The A/D field is used as an instruction for activation/deactivation of the panel ID. The MAC CE may further include at least one of a serving cell ID field, and a BWP ID field. In the MAC CE, the A/D field may be located after the panel ID field. Although the MAC CE of the example in FIG. 3B includes a single-octet (8-bit) panel ID field, the MAC CE may include a plurality of panel ID fields (octets) or may include a plurality of sets (octets) of a panel ID field and a corresponding A/D field.

For indication methods 1-2a-1 and 1-2a-2, the number of bits used for indicating activation/deactivation may depend on the maximum number of panels, and unused bits may be reserved bits.

[[Indication Method 1-2b]]

For each CC group/BWP group, panel activation/deactivation may be indicated via the MAC CE.

Up to X lists may be configured by RRC signaling. Each list may indicate a CC group/BWP group. The panel activation/deactivation may be applied to CC/BWPs in the list including the indicated CC/BWPs.

A new MAC CE for panel activation/deactivation may be introduced. The MAC CE may include a list ID field of a list of applicable CC/BWPs. The MAC CE may or does not necessarily need to include at least one of the serving cell ID field and the BWP ID field.

Figure 4A:
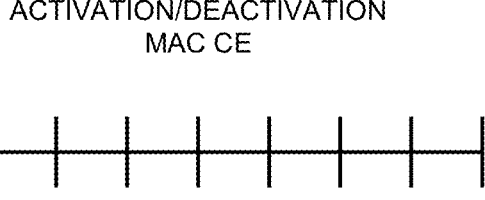
FIGS. 4A and 4B are diagrams illustrating another example of panel activation/deactivation MAC CE.

For example, as illustrated in FIG. 4A, the MAC CE may include a list ID field instead of the serving cell ID field and the BWP ID field in FIG. 3A.

Figure 4B:
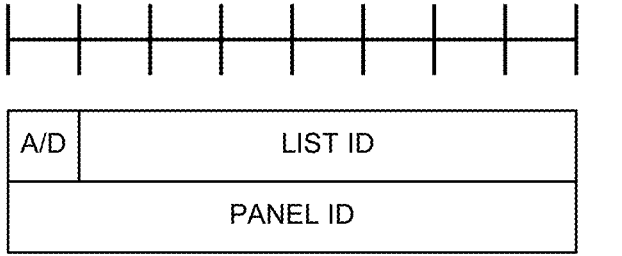

For example, as illustrated in FIG. 4B, the MAC CE may include a list ID field instead of the serving cell ID field and the BWP ID field in FIG. 3B.

This MAC CE does not necessarily need to include the list ID field. For example, if only one list is configured by RRC signaling, the MAC CE does not necessarily need to include the list ID field.

<<Indication Method 2>>

The UE may be implicitly indicated/configured to activate/deactivate the panel. The UE may be indicated/configured to activate/deactivate the panel via association between the panel and one or more specific signals.

In the indication method 2, a panel-specific specific signal may be supported.

The indication method 2 may be according to at least one of the following indication methods 2-1 and 2-2.

[Indication Method 2-1]

The UE may be indicated to activate/deactivate the panel via a configuration/instruction of association between the panel and the specific signal.

For example, if panel-specific CSI-RS measurement is supported, an association between a CSI-RS resource and a panel may be configured via RRC signaling. If there is a CSI-RS resource associated with a certain panel, the panel may be activated. If there is no CSI-RS resource associated with a certain panel, the panel may be deactivated.

[Indication Method 2-2]

The UE may be indicated to activate/deactivate a certain panel via whether or not a dynamic channel (PDCCH/PDSCH/PUCCH/PUSCH) is scheduled for the panel.

For example, if panel-specific PDCCH reception is supported and the UE does not detect a PDCCH associated with a certain panel within a certain duration as specified in the specification or as configured by RRC signaling, the panel may be deactivated. Otherwise, the panel may remain activated.

Alternatively, for example, if panel-specific PDCCH reception is supported and the UE does not detect the PDCCH associated with the panel in the number of consecutive PDCCH receptions, the panel may be deactivated. Otherwise, the panel may remain activated.

The indication method 2 may be according to at least one of the following indication methods 2a and 2b.

[Indication Method 2a]

The UE may determine the panel activation/deactivation for each CC/BWP depending on the association between the panel and the specific signal.

The panel activation/deactivation determined by the indication method 2 may be applied to the CC/BWP in which the specific signal is located.

[Indication Method 2b]

The UE may determine the panel activation/deactivation for each CC group (one or more CCs)/BWP group (one or more BWPs) depending on the association between the panel and the specific signal.

Up to X lists may be configured by RRC signaling. Each list may indicate a CC group/BWP group. The panel activation/deactivation may be applied to CC/BWPs in the list including the CC/BWPs in the indication method 2a.

<<Indication Method 3>>

The UE may support both explicit indication/configuration of panel activation/deactivation (indication method 1) and implicit indication/configuration of panel activation/deactivation (indication method 2).

For example, if activation of a certain panel is determined from both explicit and implicit indications, the panel may be activated. If deactivation of a certain panel is determined from both explicit and implicit indications, the panel may be deactivated.

If activation of a certain panel is determined from an explicit indication and a deactivation of the panel is determined from an implicit indication, any of the following indication methods 3-1, 3-2, 3-3 may be followed.

[Indication Method 3-1]

The panel is to be activated.

[Indication Method 3-2]

The panel is to be deactivated.

[Indication Method 3-3] Whether the panel is to be activated or to be deactivated depends on whether it is semi-static (semi-static, indication method 1-1/2-1) or dynamic (dynamic, indication method 1-2/2-2).

If both the explicit indication and the implicit indication are semi-static indications, the activation/deactivation of the panel may follow the explicit indication.

If one of the explicit indication and the implicit indication is dynamic indication, the activation/deactivation of the panel may follow the dynamic indication.

If both the explicit indication and the implicit indication are dynamic indications, the activation/deactivation of the panel may follow the latest indication.

If the deactivation is determined from an explicit indication and the activation is determined from an implicit indication, it may be similar to the foregoing operation if the activation is determined from an explicit indication and the deactivation is determined from an implicit indication.

According to a first embodiment, the UE may be appropriately indicated/configured to activate/deactivate the panel.

Second Embodiment

The UE panel activation/deactivation may be according to a criterion. The criterion may be at least one of the following deactivation criterion 2.

<<Deactivation Criteria>>

The criterion for deactivation may be at least one of the following deactivation criteria 1, 2, and 3.

[Deactivation Criterion 1]

The panel deactivation is based on the CSI-RS measurement results. The deactivation criterion 1 may be according to any one of the following deactivation criteria 1-1 and 1-2.

[[Deactivation Criterion 1-1]]

If, within a certain duration, the measurement result (RSRP/SINR) of the best beam in a certain panel is less than a threshold value, the panel may be deactivated.

[[Deactivation Criterion 1-2]]

If, within a certain duration, the average measurement result (RSRP/SINR) of the best X beams in a certain panel is less than a threshold value, the panel may be deactivated.

Whether the measurement result is less than the threshold value may be identified by any of the following identification methods 1-1 and 1-2:

[[Identification Method 1-1]]

The UE may measure a same CSI-RS resource by multiple panels at a same time or different times, and the UE may identify whether a measurement result is lower than a threshold value.

[[Identification Method 1-2]]

The UE may measure a same CSI-RS resource by multiple panels at a same time or different times, the UE may report a measurement result, and a base station may identify whether the measurement result is lower than a threshold value.

Figure 5:
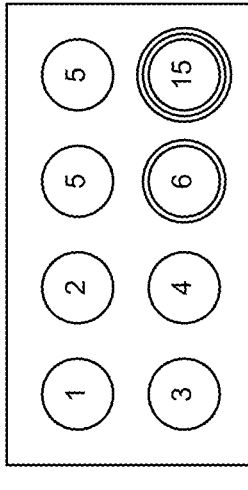
FIG. 5 is a diagram illustrating an example of panel activation/deactivation based on a deactivation criterion 1.

In the example of FIG. 5, the measurement results of the RSRPs corresponding to the eight beams of the panel #1 are 1, 2, 5, 5, 3, 4, 6, and 15, and the measurement results of the RSRPs corresponding to the eight beams of the panel #2 are 4, 4, 11, 13, 4, 5, 12, and 10.

If a threshold value is 15 using the deactivation criterion 1-1, the measurement result 15 of the best beam of panel #1 is greater than or equal to the threshold value, and the measurement result 13 of the best beam of panel #2 is less than the threshold value. Therefore, the panel #1 is to be activated and the panel #2 is to be deactivated.

If a threshold value is 11 and X=2 using the deactivation criterion 1-2, the average measurement result 10.5 of the best two beams of panel #1 is less than the threshold value, and the measurement result 12.5 of the best two beams of panel #2 is greater than or equal to the threshold value. Therefore, the panel #1 is to be deactivated and the panel #2 is to be activated.

[Deactivation Criterion 2]

The panel deactivation is based on SRS measurements. The deactivation criterion 2 may be according to any one of the following deactivation criteria 2-1 and 2-2.

[[Deactivation Criterion 2-1]]

If, within a certain duration, the measurement result (RSRP/SINR) of the best SRS in a certain panel is less than a threshold value, the panel may be deactivated.

[[Deactivation Criterion 2-2]]

If, within a certain duration, the average measurement result (RSRP/SINR) of the best X SRSs in a certain panel is less than a threshold value, the panel may be deactivated.

Whether the foregoing measurement result is less than the threshold value may also be identified by the following identification method 2-1.

[[Identification Method 2-1]]

The UE may send the SRS (by using a same spatial domain filter) for a plurality of times by a plurality of different panels, and the base station may measure the SRS and identify whether a measurement result is lower than a threshold value.

[Deactivation Criterion 3]

The panel deactivation is based on performance of PDCCH/PDSCH/PUCCH/PUSCH. The deactivation criterion 3 may be according to any one of the following deactivation criteria 3-1 and 3-2.

[[Deactivation Criterion 3-1]]

If, within a certain duration, performance of PDCCH/PDSCH/PUCCH/PUSCH in a certain panel is less than a threshold value, the panel may be deactivated. For example, the performance may be a block error rate (BLER).

[[Deactivation Criterion 3-2]]

If, within a certain duration, performance of PDCCH/PDSCH/PUCCH/PUSCH in one or more activated panels excluding a certain panel meets a requirement, the panel may be deactivated. If performance of the PDCCH/PDSCH/PUCCH/PUSCH in the plurality of panels meets a requirement, a panel to be deactivated may be selected according to at least one of the following selection methods 1 to 4.

[[Selection Method 1]]

A panel to be deactivated is selected at random.

[[Selection Method 2]] The panel with the lowest RSRP/SINR of the best beam in the panel is selected.

[[Selection Method 3]]

The panel with the lowest average RSRP/SINR of the best X beams in the panel is selected.

[[Selection Method 4]]

A panel with the worst performance of PDCCH/PDSCH/PUCCH/PUSCH is selected.

The performance being less than a threshold value or the performance meeting the requirement may be identified by any of the following identification methods 3-1 and 3-2.

[[Identification Method 3-1]]

The UE transmits or receives the PDCCH/PDSCH/PUCCH/PUSCH by a plurality of panels at a same time or different times, and the UE may identify whether performance of the PDCCH/PDSCH/PUCCH/PUSCH is lower than a threshold value, or may identify whether the performance meets a requirement.

[[Identification Method 3-2]]

The UE transmits or receives the PDCCH/PDSCH/PUCCH/PUSCH by a plurality of panels at a same time or different times, the UE reports a result of transmission or reception, and the base station may identify whether performance of the PDCCH/PDSCH/PUCCH/PUSCH is lower than a threshold value, or may identify whether the performance meets a requirement.

Figure 6:
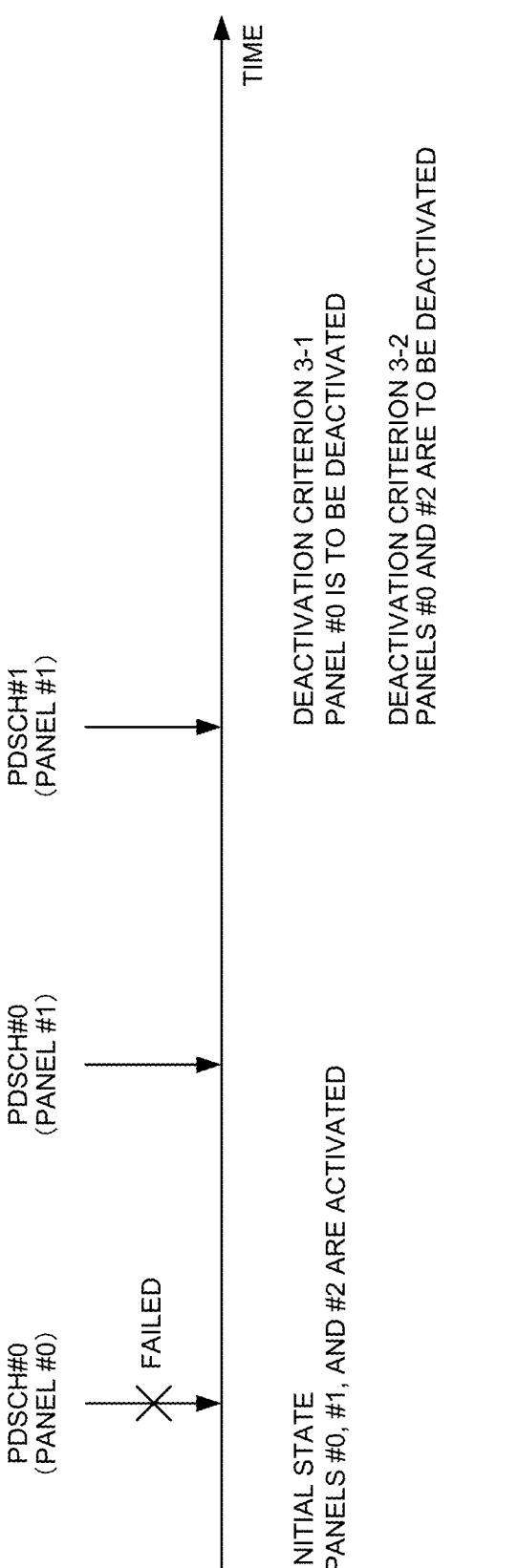
FIG. 6 is a diagram illustrating an example of panel activation/deactivation based on a deactivation criterion 3.

In the example of FIG. 6, panels #0, #1, and #2 are activated. The UE fails to receive the PDSCH #0 that uses the panel #0, succeeds in receiving the PDSCH #0 that uses the panel #1, and succeeds in receiving the PDSCH #1 that uses the panel #1.

If the performance of the PDSCH of the panel #0 is smaller than the threshold value using the deactivation criterion 3-1, the panel #0 is to be deactivated.

If the performance of the PDSCH of the panel #0 does not meet the requirement and the performance of the PDSCH of the panel #1 meets the requirement by using the deactivation criterion 3-2, since the requirement of the PDSCH is ensured by using the panel #1, other panels #0 and #2 are to be deactivated.

<<Activation Criteria>>

The criterion for activation may be at least one of the following activation criteria 1, 2, and 3.

[Activation Criterion 1]

The panel activation is based on the CSI-RS measurement results.

Under the following assumption 2-1-1, Activation criterion 1 may be according to any of Activation criteria 1-1 and 1-2.

[[Assumption 2-1-1]]

The UE does not measure CSI-RS with the deactivated panel. The base station determines, based on a measurement result of the currently activated panel, whether a new panel needs to be activated. If the measurement result of the currently activated panel is low, the base station activates a new panel.

[[Activation Criterion 1-1]]

If, within a certain duration, for one or N or all of the activated panels, the best beam measurement result (RSRP/SINR) within the panel is less than a threshold value, a new panel selected at random may be activated.

[[Activation Criterion 1-2]]

If, within a certain duration, for one or N or all of the activated panels, an average measurement result of the best X beams (RSRP/SINR) in the panel is less than a threshold value, a new panel selected at random may be activated.

Under the following assumption 2-1-2, activation criterion 1 may be according to any of activation criteria 1-3 to 1-8.

[[Assumption 2-1-2]]

The UE measures CSI-RS with the deactivated panel. If the measurement result of the panel is good (Activation Criteria 1-3 and 1-4), or if the measurement result of the panel is better than the measurement result of the currently activated panel (Activation Criteria 1-5 and 1-6), or if the measurement result of the currently activated panel is low (Activation Criteria 1-7 and 1-8), the base station determines to activate the panel.

[[Activation Criterion 1-3]]

If, within a certain duration, the measurement result (RSRP/SINR) of the best beam in a panel is larger than a threshold value, the panel may be activated.

[[Activation Criterion 1-4]]

If, within a certain duration, the average measurement result (RSRP/SINR) of the best X beams in a panel is larger than a threshold value, the panel may be activated.

[[Activation Criterion 1-5]]

If, within a certain duration, the measurement result (RSRP/SINR) of the best beam in a panel is larger than one or N or all of the activated panels, the panel may be activated.

[[Activation Criterion 1-6]]

If, within a certain duration, the average measurement result (RSRP/SINR) of the best X beams in a panel is larger than one or N or all of the activated panels, the panel may be activated.

In the example of FIG. 7, the panel #1 is deactivated, and the panels #2 and #3 are activated. RSRP measurement results corresponding to the eight beams of the panel #1 are 1, 2, 5, 5, 3, 4, 6, and 15; RSRP measurement results corresponding to the eight beams of the panel #2 are 4, 4, 11, 13, 4, 5, 12, and 10; and RSRP measurement results corresponding to the eight beams of the panel #3 are 4, 4, 11, 16, 4, 5, 12, and 10.

If a threshold value is 11 using the activation criterion 1-3, since the measurement result 15 of the best beam of panel #1 is greater than or equal to the threshold value, panel #1 is to be activated.

If a threshold value is 11 and X=2 using activation criterion 1-4, since the average measurement result 10.5 of the best two beams of panel #1 is less than the threshold value, panel #1 is not activated.

If N=1 using the activation criterion 1-5, the measurement result 15 of the best beam of panel #1 is greater than the measurement result 13 of the best beam of panel #2 (measurement result of one panel). Therefore, the panel #1 is to be activated.

If N=2 using the activation criterion 1-5, the measurement result 15 of the best beam of panel #1 is greater than the measurement result 13 of the best beam of panel #2 and less than the measurement result 16 of the best beam of panel #3. Therefore, since the measurement result of panel #1 does not satisfy a requirement to be greater than the measurement results of both of the two panels, the panel #1 is not activated.

If X=2 and N=1 using the activation criterion 1-6, the average measurement result 10.5 of the best two beams of panel #1 is less than the average measurement result 12.5 of the best two beams of panel #2 and less than the average measurement result 14 of the best two beams of panel #3. Therefore, the panel #1 is not activated.

[[Activation Criterion 1-7]]

If, within a certain duration, for one or N or all of the activated panels, the best beam measurement result (RSRP/SINR) within the panel is below a threshold value, a certain panel may be activated. If the best beam measurement result of the deactivated panel is greater than the threshold value, the panel with the highest measurement result among deactivated panels may be activated.

[[Activation Criterion 1-8]]

If, within a certain duration, for one or N or all of the activated panels, the best X beams average measurement result (RSRP/SINR) within the panel is below a threshold value, a certain panel may be activated. If the best X beams average measurement result within the deactivated panels is greater than the threshold value, the panel with the highest average measurement result among the deactivated panels may be activated.

Figure 8:
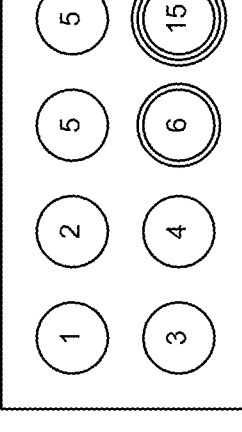
FIG. 8 is a diagram illustrating another example of panel activation/deactivation based on the activation criterion 1.

In the example of FIG. 8, the panel #1 is deactivated, and the panel #2 is activated. The measurement results of the RSRPs corresponding to the eight beams of the panel #1 are 1, 2, 5, 5, 3, 4, 6, and 15, and the measurement results of the RSRPs corresponding to the eight beams of the panel #2 are 4, 4, 11, 13, 4, 5, 12, and 10.

If the threshold is 14 using the activation criterion 1-7, the measurement result 13 of the best beam of panel #2 is less than the threshold. Since the measurement result 15 of the best beam of panel #1 is greater than or equal to the threshold value, the panel #1 is to be activated.

If the threshold is 14 and X=2 using the activation criterion 1-8, the average measurement result 12.5 of the best two beams of panel #2 is less than the threshold. Since the average measurement result 10.5 of the best two beams of panel #1 is less than the threshold value, the panel #1 is not activated.

[Activation Criterion 2]

The panel activation is based on SRS measurements. Under the following assumption 2-2-1, activation criterion 2 may be according to any of activation criteria 2-1 and 2-2.

[[Assumption 2-2-1]]

The UE does not send the SRS using the deactivated panel. The base station determines, based on a measurement result of the currently activated panel, whether a new panel needs to be activated. If the measurement result of the currently activated panel is low, the base station activates a new panel.

[[Activation Criterion 2-1]]

If, within a certain duration, for one or N or all of the activated panels, the best SRS measurement result (RSRP/SINR) in the panel is less than a threshold value, a new panel selected at random may be activated.

[[Activation Criterion 2-2]]

If, within a certain duration, for one or N or all of the activated panels, an average measurement result of the best X SRSs (RSRP/SINR) in the panel is less than a threshold value, a new panel selected at random may be activated.

Under the following assumption 2-2-2, activation criterion 2 may be according to any of activation criteria 2-3 to 2-8.

[[Assumption 2-2-2]]

The UE is configured to transmit the SRS using the deactivated panel.

[[Activation Criterion 2-3]]

If, within a certain duration, the measurement result (RSRP/SINR) of the best SRS in a panel is larger than a threshold value, the panel may be activated.

[[Activation Criterion 2-4]]

If, within a certain duration, the average measurement result (RSRP/SINR) of the best X SRSs in a panel is larger than a threshold value, the panel may be

[[Activation Criterion 2-5]]

If, within a certain duration, the measurement result (RSRP/SINR) of the best SRS in a panel is larger than one or N or all of the activated panels, the panel may be activated.

[[Activation Criterion 2-6]]

If, within a certain duration, the average measurement result (RSRP/SINR) of the best X SRSs in a panel is larger than one or N or all of the activated panels, the panel may be activated.

[[Activation Criterion 2-7]]

If, within a certain duration, for one or N or all of the activated panels, the best SRS measurement result (RSRP/SINR) within the panel is below a threshold value, a certain panel may be activated. If the best SRS measurement result of the deactivated panel is greater than the threshold value, the panel with the highest measurement result among the deactivated panels may be activated.

[[Activation Criterion 2-8]]

If, within a certain duration, for one or N or all of the activated panels, the best X SRSs average measurement result (RSRP/SINR) within the panel is below a threshold value, a certain panel may be activated. If the best X SRSs average measurement result within the deactivated panels is greater than the threshold value, the panel with the highest average measurement result among the deactivated panels may be activated.

[Activation criterion 3]

The panel activation is based on performance of PDCCH/PDSCH/PUCCH/PUSCH.

Under the following assumption 2-3-1, activation criterion 3 may be according to any of activation criteria 3-1 and 3-2.

[[Assumption 2-3-1]]

The UE does not receive the PDCCH/PDSCH or send the PUCCH/PUSCH using the deactivated panel. The base station determines, based on performance of the currently activated panel, whether a new panel needs to be activated.

[[Activation Criterion 3-1]]

If, within a certain duration, for one or N or all of the activated panels, the performance of the best beam within the panel is less than a threshold value (the error rate (BLER) is greater than the threshold value), a new panel selected at random may be activated.

[[Activation Criterion 3-2]]

If, within a certain duration, the performance of the PDCCH/PDSCH/PUCCH/PUSCH using the currently activated panel does not meet the requirements, a new panel selected at random may be activated.

For example, if performance using an activated panel is the worst and guaranteed using other activated panels, a new panel is not activated.

Figure 9:
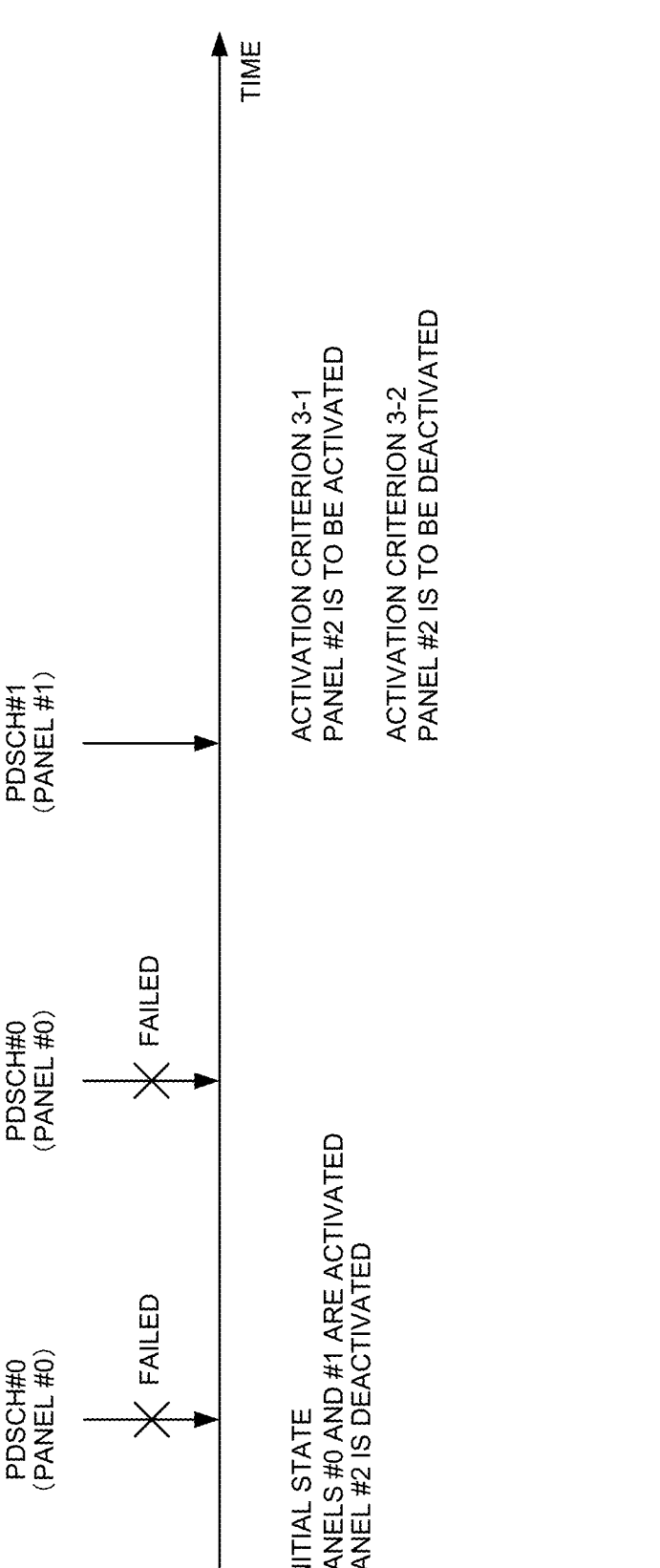
FIG. 9 is a diagram illustrating an example of panel activation/deactivation based on the activation criterion 3.

In the example of FIG. 9, the panels #0 and #1 are activated, and the panel #2 is deactivated. The UE fails to receive the PDSCH #0 that uses the panel #0, fails again in receiving the PDSCH #0 that uses the panel #0, and succeeds in receiving the PDSCH #1 that uses the panel #1.

If N=1 and the performance of the PDSCH of the panel #0 is smaller than the threshold, using the activation criterion 3-1, the panel #2 is to be deactivated.

If the performance of the PDSCH of the panel #0 does not meet the requirement and the performance of the PDSCH of the panel #1 meets the requirement, using the activation criterion 3-2, the panel #2 is not activated.

According to the second embodiment, by following the criteria, the UE can appropriately perform the activation/deactivation of the UE panel.

Third Embodiment

The UE may support transmitting or receiving specific signals using a deactivated panel. It may be defined whether or not the UE supports DL reception and UL transmission using a deactivated UE panel. For example, as in FIG. 10, assumption 3-1 and one of operations 1-1, 1-2, 2-1, and 2-2 may be used, and assumption 3-2 and one of operations 3-1 to 3-4 may be used.

[Assumption 3-1]

The activation/deactivation of the panel for DL reception and the activation/deactivation of the panel for UL transmission may be performed separately.

Under assumption 3-1, either operation 1-1 or 1-2 may be supported for panels deactivated for DL reception.

[[Operation 1-1]]

The UE does not necessarily need to support CSI-RS reception using a deactivated panel and PDCCH/PDSCH reception using a deactivated panel.

[[Operation 1-2]]

The UE may support CSI-RS reception using a deactivated panel and does not necessarily need to support PDCCH/PDSCH reception using a deactivated panel.

Under assumption 3-1, either operation 2-1 or 2-2 may be supported for panels deactivated for UL reception.

[[Operation 2-1]] The UE does not necessarily need to support SRS transmission using a deactivated panel and PUCCH/PUSCH transmission using a deactivated panel.

[[Operation 2-2]]

The UE may support SRS transmission using a deactivated panel and does not necessarily need to support PUCCH/PUSCH transmission using a deactivated panel.

[[Assumption 3-2]]

The activation/deactivation of the panel for DL reception and the activation/deactivation of the panel for UL transmission may be performed together.

Under assumption 3-2, any of operations 3-1 to 3-4 may be supported.

[[Operation 3-1]]

The UE does not necessarily need to support CSI-RS reception using deactivated panels, PDCCH/PDSCH reception using deactivated panels, SRS transmission using deactivated panels, and PUCCH/PUSCH transmission using deactivated panels.

[[Operation 3-2]]

The UE may support CSI-RS reception using deactivated panels, and does not necessarily need to support PDCCH/PDSCH reception using deactivated panels, SRS transmission using deactivated panels, and PUCCH/PUSCH transmission using deactivated panels.

[[Operation 3-3]]

The UE may support SRS transmission using deactivated panels and does not necessarily need to support CSI-RS reception using deactivated panels, PDCCH/PDSCH reception using deactivated panels, and PUCCH/PUSCH transmission using deactivated panels.

[[Operation 3-4]]

The UE may support CSI-RS reception using deactivated panels and SRS transmission using deactivated panels, and does not necessarily need to support PDCCH/PDSCH reception using deactivated panels and PUCCH/PUSCH transmission using deactivated panels.

According to the third embodiment, the UE can appropriately perform an operation on the deactivated panel.

Fourth Embodiment

The UE may be implicitly indicated to activate the UE panel. The UE may receive information regarding an association between the specific signal and any of the plurality of panels. The UE may activate one of the plurality of panels based on the information. The implicit indication may be according to at least one of the following activation methods 1 and 2.

<<Activation Method 1>>

The UE may be indicated, via an association configured/instructed by RRC signaling/MAC CE between a certain panel and a specific signal, to activate the panel.

The activation method 1 may be at least one of the following activation methods 1-1 to 1-7.

[Activation Method 1-1]

The UE may be instructed, via an association configured/instructed by RRC signaling/MAC CE between a certain panel and a CSI-RS resource, to activate the panel.

Here, the following assumptions may be used.

[Assumption]

An association between a certain panel and a CSI-RS resource is configured/indicated by at least one of RRC signaling and a MAC CE. The panel may be associated with at least one of a CSI reporting configuration (CSI-report- Config), a CSI resource configuration (CSI-ResourceConfig), a CSI-RS resource set (CSI-RS-resourceSet), a CSI-RS resource (CSI-RS-resource), and a TCI state (TCI-state).

The activation method 1-1 may be at least one of the following activation methods 1-1-1 to 1-1-3.

[[Activation Method 1-1-1]]

If a certain panel is associated with a CSI-RS resource, the panel is to be activated.

[[Activation Method 1-1-2]]

If a certain panel is associated with a CSI-RS resource, the panel is to be activated. The CSI-RS resource is associated with the activated CSI-RS resource set.

The activation method 1-1-2 may be used for at least one of semi-persistent (SP)-CSI-RS and aperiodic (AP)-CSI-RS. For the SP-CSI-RS resource, the activated CSI-RS resource set may be an SP-CSI-RS resource set to be activated by the MAC CE. For the AP-CSI-RS, the activated CSI-RS resource set may be an AP-CSI-RS resource set to be triggered by DCI.

[[Activation Method 1-1-3]]

If a certain panel is associated with a CSI-RS resource, the panel is to be activated. The CSI-RS resource is associated with the activated CSI report.

For a periodic (P)-CSI-RS resource, the activated CSI report may be a P-CSI report, may be an SP-CSI report activated by a MAC CE, or may be an AP-CSI report triggered by DCI. For a SP-CSI-RS resource, the activated CSI report may be an SP-CSI report activated by a MAC CE, or may be an AP-CSI report triggered by DCI. For the AP-CSI-RS resource, the activated CSI report may be a DCI-triggered AP-CSI report.

[Activation Method 1-2]

The UE may be indicated, via an association configured/instructed by RRC signaling/MAC CE between a certain panel and a PDCCH, to activate the panel.

Here, the following assumptions may be used.

[Assumption]

An association between a panel and a PDCCH is configured/indicated by at least one of RRC signaling and a MAC CE. The panel may be associated with at least one of a CORESET and a TCI state.

If an association between a certain panel and a CORESET is configured/indicated by at least one of RRC signaling and a MAC CE, the panel may be activated.

The association between a certain panel and a CORESET being configured/indicated by at least one of RRC signaling and a MAC CE may be at least one of that the panel is directly associated with the CORESET, that the panel is associated with one of several TCI states set for the CORESET in the RRC signaling, and that the panel is associated with an activated TCI state in the MAC CE for the CORESET.

[Activation Method 1-3]

The UE may be indicated, via an association configured/instructed by RRC signaling/MAC CE between a certain panel and a PDSCH, to activate the panel.

Here, the following assumptions may be used.

[Assumption]

An association between a certain panel and a PDSCH is configured/indicated by at least one of RRC signaling and a MAC CE. The panel may be associated with a TCI state.

If an association between a certain panel and a PDSCH is configured/indicated by at least one of RRC signaling and a MAC CE, the panel may be activated.

The association between a certain panel and a PDSCH being configured/indicated by at least one of the RRC signaling and the MAC CE may be at least one of that the panel is associated with one of several TCI states configured in the PDSCH configuration in the RRC signaling (PDSCH-Config), and that the panel is associated with one of several activated TCI states in the MAC CE for PDSCH.

[Activation Method 1-4]

The UE may be indicated, via an association configured/instructed by RRC signaling/MAC CE between a certain panel and an SRS, to activate the panel.

Here, the following assumptions may be used.

[Assumption]

An association between a certain panel and an SRS resource is configured/indicated by at least one of RRC signaling and a MAC CE. The panel may be associated with at least one of an SRS resource set (SRS-resourceSet), an SRS resource (SRS-resource), and SRS spatial relationship information (SRS-spatialRelationInfo).

The activation method 1-4 may be at least one of the following activation methods 1-4-1 and 1-4-2.

[[Activation Method 1-4-1]]

If a certain panel is associated with a SRS resource, the panel is to be activated.

[[Activation Method 1-4-2]]

If a certain panel is associated with an activated SRS resource, the panel is to be activated.

The activation method 1-4-2 may be used for at least one of the SP-SRS and the AP-SRS. For the SP-SRS resource, the activated SRS resource may be an SP-SRS resource activated by the MAC CE. For the AP-SRS, the activated SRS resource may be an AP-SRS resource to be triggered by the DCI.

The activation method 1-4 may be applied to one or more SRS applications (usage) among beam management (BM), codebook-based transmission (codebook-based transmission, codebook (CB)), non-codebook-based transmission (non-codebook-based transmission, nonCodebook (NCB)), and antenna switching (antennaSwitching).

[Activation Method 1-5]

The UE may be instructed, via an association configured/instructed by RRC signaling/MAC CE between a certain panel and a PUCCH, to activate the panel.

Here, the following assumptions may be used.

[Assumption]

An association between a panel and a PUCCH is configured/indicated by at least one of RRC signaling and a MAC CE. The panel may be associated with at least one of a PUCCH resource set (PUCCH-ResourceSet), a PUCCH resource (PUCCH-Resource), and PUCCH spatial relation information (PUCCH-spatialRelationInfo).

If an association between a certain panel and a PUCCH resource is configured/indicated by at least one of RRC signaling and a MAC CE, the panel may be activated.

The association between a certain panel and a PUCCH resource being configured/indicated by at least one of RRC signaling and a MAC CE may be at least one of that the panel is directly associated with a PUCCH resource, that the panel is associated with one of several PUCCH spatial relation information set in PUCCH configuration information (PUCCH-Config), and that the panel is associated with PUCCH spatial relation information activated by the MAC CE for a PUCCH resource.

[Activation Method 1-6]

The UE may be indicated, via an association configured/instructed by RRC signaling/MAC CE between a certain panel and a PUSCH, to activate the panel.

The activation method 1-6 may be at least one of the following activation methods 1-6-1 and 1-6-2.

[[Activation Method 1-6-1]]

A same mechanism as an SRS in which an SRS application is at least one of codebook-based transmission and non-codebook-based transmission is used.

[[Activation Method 1-6-2]]

If a TCI state for the UL is supported and an association between a certain panel and a PUSCH is configured/indicated by at least one of RRC signaling and a MAC CE, the panel is to be activated.

The association between a certain panel and a PUSCH being configured/indicated by at least one of the RRC signaling and the MAC CE may be at least one of that the panel is associated with one of several TCI states configured for the PUSCH in the RRC signaling, and that the panel is associated with one of several TCI states activated for the PUSCH in the MAC CE.

[Activation Method 1-7] A combination of at least two of the activation methods 1-1 to 1-6 may be used.

<<Activation Method 2>>

Activation of a certain panel may be indicated via whether or not a channel (PDCCH/PDSCH/PUCCH/PUSCH, dynamic channel/semi-persistent channel) is scheduled on the panel.

A mapping between a certain panel and a TCI/QCL/spatial relation of PDSCH/PUSCH/PUCCH may be configured for the PDSCH/PUSCH/PUCCH. The DCI may schedule the PDSCH/PUSCH/PUCCH. The UE may identify which panels are activated for receiving or transmitting the scheduled PDSCH/PUSCH/PUCCH.

For example, an association between the TCI state #0 and the panel #1 and an association between the TCI state #1 and the panel #2 are configured for the PDSCH. In a case where the DCI schedules the PDSCH together with the indication of the TCI state #0, the UE interprets (recognizes) that the instruction is given to activate the panel #1 for reception of the PDSCH.

A TCI, a QCL, a spatial relation, a time resource (symbols, slots, etc.), and a frequency resource (subcarriers, resource blocks, etc.) may be replaced with each other.

The activation method 2 may be at least one of the following activation methods 2-1 to 2-5.

[Activation Method 2-1]

Activation of a certain panel may be indicated via whether or not a dynamic PDCCH is received on the panel.

Here, the following assumptions may be used.

[Assumption]

Panel-specific PDCCH reception is supported. A panel may be associated with at least one of a CORESET and a TCI state.

In a case where the panel deactivation is applied only to UL transmission, the activation method 2-1 may be used. A panel deactivated for UL transmission may be used for DL reception.

If a PDCCH associated with a certain panel is detected by the UE, the panel may be activated.

If the UE monitors a PDCCH on a CORESET associated with a certain panel, the UE may activate the corresponding panel.

Mapping of at least one of the CORESET, the search space, the TCI state of the CORESET, and the panel ID may be set. If the UE monitors a PDCCH on a search space/CORESET associated with a certain panel, the UE may activate the corresponding panel for monitoring the PDCCH.

[Activation Method 2-2]

Activation of a certain panel may be indicated via whether or not a dynamic PDSCH is received on the panel.

Here, the following assumptions may be used.

[Assumption]

Panel-specific PDSCH reception is supported. The panel may be associated with a TCI state or may be indicated by the DCI.

In a case where the panel deactivation is applied only to UL transmission, the activation method 2-2 may be used. A panel deactivated for UL transmission may be used for DL reception. In a case where the PDCCH is transmitted on the activated panel, the PDSCH using the deactivated panel may be indicated by the DCI.

In a case of receiving a scheduling grant that instructs the UE to receive a PDSCH using a certain panel, the panel may be activated. The scheduling grant may be DCI for scheduling a dynamic PDSCH or may be activation DCI of semi-persistent scheduling (SPS, DL-SPS).

[Activation Method 2-3]

Activation of a certain panel may be indicated via whether or not a dynamic PUCCH on the panel is scheduled.

Here, the following assumptions may be used.

[Assumption]

Panel-specific PUCCH transmission is supported. The panel may be associated with at least one of a PUCCH resource set, a PUCCH resource, and PUCCH spatial relation information.

If the UE is configured/instructed to transmit a PUCCH on a certain panel, the panel may be activated. The PUCCH transmission may be semi-persistent PUCCH transmission or dynamic PUCCH transmission.

In the present disclosure, the semi-persistent PUCCH transmission is a PUCCH scheduled to be semi-persistent, and may be, for example, a PUCCH transmission carrying SP-CSI on the PUCCH. In the present disclosure, the dynamic PUCCH transmission is a dynamically scheduled PUCCH, for example, may be a PUCCH transmission carrying at least one of HARQ-ACK and A-CSI on the PUCCH.

[Activation Method 2-4]

Activation of a certain panel may be indicated via whether or not a dynamic PUSCH on the panel is scheduled.

Here, the following assumptions may be used.

[Assumption]

Panel-specific PUSCH transmission is supported. The panel may be associated with at least one of the TCI state for UL and the SRS, or may be indicated by the DCI.

If the UE receives a scheduling grant indicating transmission of a PUSCH on a certain panel, the panel may be activated. The scheduling grant may be DCI for scheduling the dynamic PUSCH, may be an RRC configuration of a type 1 configuration grant (configured grant (CG)), or may be activation DCI of a type 2 configuration grant.

[Activation Method 2-5]

A combination of at least two of the activation methods 2-1 to 2-4 may be used.

According to a fourth embodiment, the UE can appropriately activate the panel.

Fifth Embodiment

The UE may be implicitly instructed to deactivate the UE panel. The UE may receive information regarding an association between the specific signal and any of the plurality of panels. The UE may deactivate one of the plurality of panels based on the information. The implicit indication may be according to at least one of the following deactivation methods 1 and 2.

<<Deactivation Method 1>>

The UE may be indicated, via an association configured/instructed by at least one of RRC signaling and MAC CE between a panel and a specific signal, to deactivate the panel.

The deactivation method 1 may be at least one of the following deactivation methods 1-1 and 1-2.

[Deactivation Method 1-1]

If an association between a certain panel and a specific signal is not configured/indicated, the panel may be deactivated.

The deactivation method 1-1 may be at least one of the following deactivation methods 1-1-1 and 1-1-2.

[[Deactivation Method 1-1-1]]

If an association between a certain panel and a specific signal is not configured/indicated by at least one of RRC signaling and a MAC CE, the panel may be deactivated.

Figures 11A, 11B:
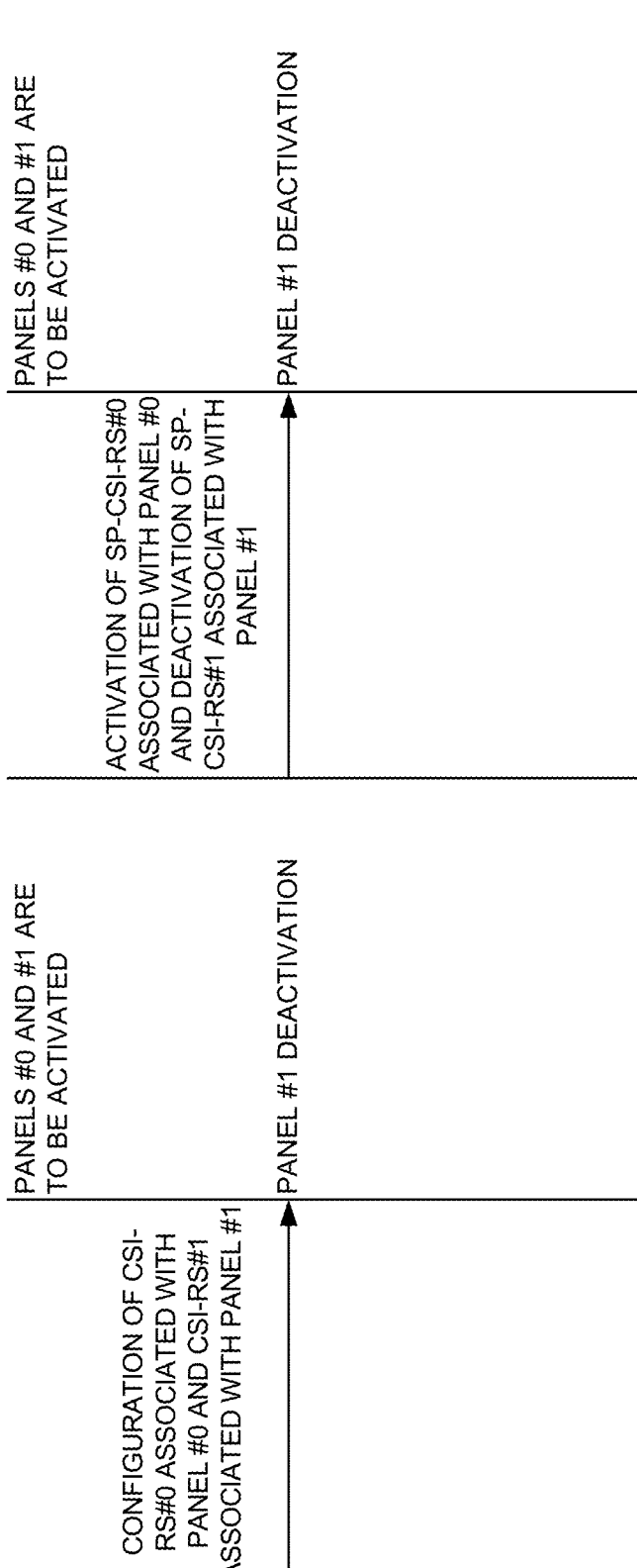
FIGS. 11A and 11B are diagrams illustrating an example of a deactivation method 1-1.

In the example of FIG. 11A, panels #0 and #1 are activated. In this state, the UE receives information indicating CSI-RS resource #0 associated with the panel #0 and CSI-RS resource #1 associated with the panel #0. Here, since the information indicating the association between the panel and the CSI-RS resource does not include information regarding the association between the panel #1 and the CSI-RS resource, the UE deactivates the panel #1.

[[Deactivation Method 1-1-2]]

For at least one specific signal of CSI-RS and SRS, if the association between a certain panel and the activated resource is not configured/indicated by at least one of RRC signaling and MAC CE, the panel may be deactivated.

For a CSI-RS, the activated resource may be a CSI-RS resource associated with the activated CSI resource set. For the SP-CSI-RS resource, the activated CSI resource set may be an SP-CSI-RS resource set to be activated by the MAC CE. For the AP-CSI-RS resource, the activated CSI-RS resource set may be an AP-CSI-RS resource set triggered by DCI.

Deactivation method 1-1-2 may be used for at least one of SP-CSI-RS and AP-CSI-RS.

In the example of FIG. 11B, panels #0 and #1 are activated. In this state, the UE receives information indicating the SP-CSI-RS resource #0 associated with the panel #0 and the SP-CSI-RS resource #1 associated with the panel #0, activates the SP-CSI-RS resource #0, and receives information for deactivating the SP-CSI-RS resource #1. Here, since there is no CSI-RS resource associated with the panel #1 among the activated CSI-RS resources, the UE deactivates the panel #1.

For a CSI-RS, the activated resource may be a CSI-RS resource associated with the activated CSI report. For a P-CSI-RS resource, the activated CSI report may be a P-CSI report, may be an SP-CSI report activated by a MAC CE, or may be an AP-CSI report triggered by DCI. For a SP-CSI-RS resource, the activated CSI report may be an SP-CSI report activated by a MAC CE, or may be an AP-CSI report triggered by DCI. For the AP-CSI-RS resource, the activated CSI report may be a DCI-triggered AP-CSI report.

For a SRS, the activated resource may be an activated SRS resource. For the SP-SRS resource, the activated SRS resource may be an SRS resource activated by the MAC CE. For the AP-SRS resource, the activated SRS resource may be an AP-SRS resource triggered by the DCI.

The AP-CSI-RS/AP-SRS is one shot. Therefore, when the AP-CSI-RS/AP-SRS is triggered, a panel associated with the AP-CSI-RS/AP-SRS may be activated, and the panel may be deactivated after the AP-CSI-RS reception/AP-SRS transmission.

[Deactivation Method 1-2]

If, within a certain duration, an association between a certain panel and a specific signal is not configured/indicated, the panel may be deactivated.

The deactivation method 1-2 may be at least one of the following deactivation methods 1-2-1 and 1-2-2.

[[Deactivation Method 1-2-1]]

If, within a certain duration, an association between a certain panel and a specific signal is not configured/indicated by at least one of RRC signaling and a MAC CE, the panel may be deactivated.

A timer defined in the specification or set by RRC signaling may be held for each panel. If an association between a certain panel and a specific signal is not set, a timer corresponding to the panel may be started. If the association between the panel and the specific signal is set, a timer corresponding to the panel may be reset. If a timer corresponding to a certain panel expires, the panel may be deactivated.

Figure 12:
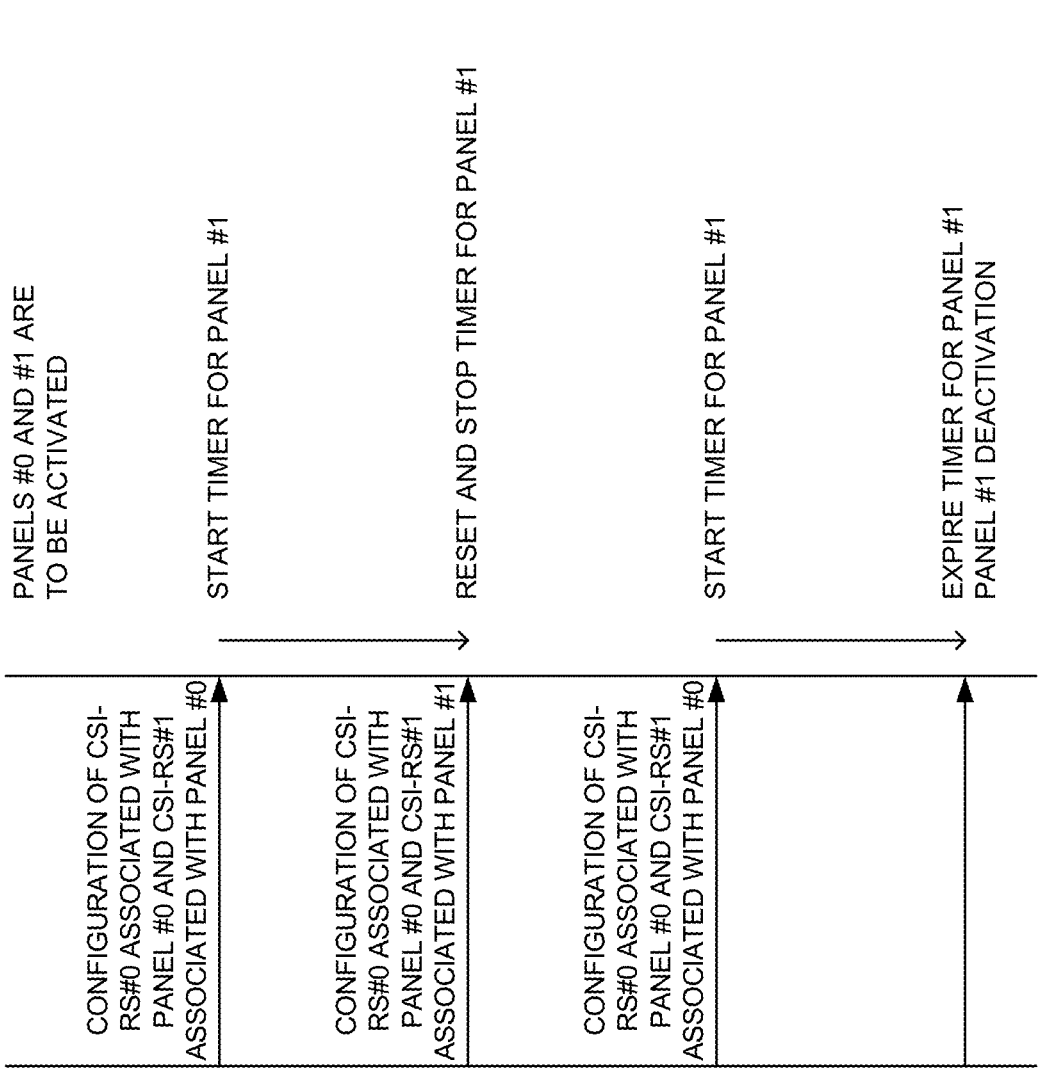
FIG. 12 is a diagram illustrating an example of a deactivation method 1-2.

In the example of FIG. 12, panels #0 and #1 are activated. In this state, the UE receives information indicating CSI-RS resource #0 associated with the panel #0 and CSI-RS resource #1 associated with the panel #0. Here, since the information indicating the association between the panel and the CSI-RS resource does not include information regarding the association between the panel #1 and the CSI-RS resource, the UE starts a timer corresponding to the panel #1.

The base station then changes the panel #0 associated with CSI-RS resource #0 to the panel #1 for measurement. Before the timer expires, the UE receives information indicating CSI-RS resource #0 associated with the panel #0 and CSI-RS resource #1 associated with the panel #1. Here, since the information indicating the association between the panel and the CSI-RS resource includes information regarding the association between the panel #1 and the CSI-RS resource, the UE resets the timer corresponding to the panel #1.

Thereafter, if the measurement result is bad, the base station returns the panel #1 associated with the CSI-RS resource #0 to the panel #0. The UE receives information indicating CSI-RS resource #0 associated with the panel #0 and CSI-RS resource #1 associated with the panel #0. Here, since the information indicating the association between the panel and the CSI-RS resource does not include information regarding the association between the panel #1 and the CSI-RS resource, the UE starts a timer corresponding to the panel #1.

Thereafter, when the timer expires, the UE deactivates panel #1.

By using the timer, unnecessary deactivation and activation can be avoided.

[[Deactivation Method 1-2-2]]

For at least one specific signal of CSI-RS and SRS, if, within a certain duration, the association between a certain panel and the activated resource is not configured/indicated by at least one of RRC signaling and MAC CE, the panel may be deactivated.

A timer defined in the specification or set by RRC signaling may be held for each panel. If an association between a certain panel and the activated resource is not set, a timer corresponding to the panel may be started. If the association between the panel and the activated resource is set, a timer corresponding to the panel may be reset. If a timer corresponding to a certain panel expires, the panel may be deactivated.

For a CSI-RS, the activated resource may be a CSI-RS resource associated with the activated CSI resource set. For the SP-CSI-RS resource, the activated CSI resource set may be an SP-CSI-RS resource set to be activated by the MAC CE. For the AP-CSI-RS resource, the activated CSI-RS resource set may be an AP-CSI-RS resource set triggered by DCI.

For a CSI-RS, the activated resource may be a CSI-RS resource associated with the activated CSI report. For a P-CSI-RS resource, the activated CSI report may be a P-CSI report, may be an SP-CSI report activated by a MAC CE, or may be an AP-CSI report triggered by DCI. For a SP-CSI-RS resource, the activated CSI report may be an SP-CSI report activated by a MAC CE, or may be an AP-CSI report triggered by DCI. For the AP-CSI-RS resource, the activated CSI report may be a DCI-triggered AP-CSI report.

Figures 13A, 13B:
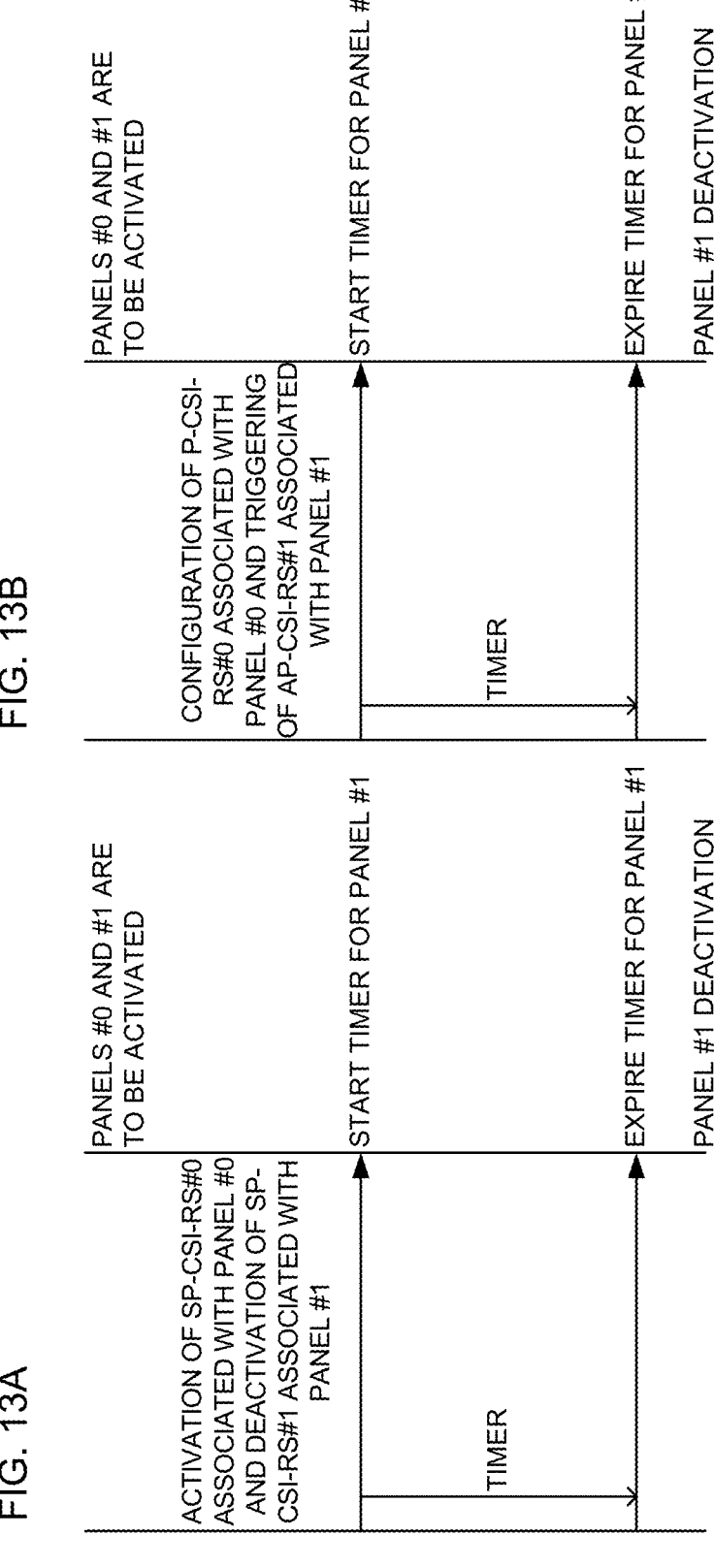
FIGS. 13A and 13B are diagrams illustrating another example of the deactivation method 1-2.

In the example of FIG. 13A, panels #0 and #1 are activated. In this state, the UE receives information indicating the SP-CSI-RS resource #0 associated with the panel #0 and the SP-CSI-RS resource #1 associated with the panel #0, activates the SP-CSI-RS resource #0, and receives information for deactivating the SP-CSI-RS resource #1. Here, since there is no CSI-RS resource associated with the panel #1 among the activated CSI-RS resources, the UE starts the timer corresponding to the panel #1.

The base station then changes the panel #0 associated with CSI-RS resource #0 to the panel #1 for measurement. Before the timer expires, the UE receives information indicating CSI-RS resource #0 associated with the panel #0 and CSI-RS resource #1 associated with the panel #1. Here, since the information indicating the association between the panel and the CSI-RS resource includes information regarding the association between the panel #1 and the CSI-RS resource, the UE resets the timer corresponding to the panel #1.

In the example of FIG. 13B, panels #0 and #1 are activated. In this state, the UE receives information indicating P-CSI-RS resource #0 associated with the panel #0 and AP-CSI-RS resource #1 associated with the panel #0, and receives information triggering the AP-CSI-RS resource #1. Here, since there is no CSI-RS resource associated with the panel #1 among the activated CSI-RS resources, the UE starts the timer corresponding to the panel #1. Here, the UE recognizes the configured P-CSI-RS resource as an activated CSI-RS resource, and does not recognize the triggered AP-CSI-RS resource as an activated CSI-RS resource.

Thereafter, when the timer expires, the UE deactivates panel #1.

For a SRS, the activated resource may be an activated SRS resource. For the SP-SRS resource, the activated SRS resource may be an SRS resource activated by the MAC CE. For the AP-SRS resource, the activated SRS resource may be an AP-SRS resource triggered by the DCI.

The AP-CSI-RS/AP-SRS is one shot. Therefore, when the AP-CSI-RS/AP-SRS is triggered, a panel associated with the AP-CSI-RS/AP-SRS may be activated, and the panel may be deactivated after the AP-CSI-RS reception/AP-SRS transmission.

<<Deactivation Method 2>>

Deactivation of a certain panel may be indicated via whether or not a channel (PDCCH/PDSCH/PUCCH/PUSCH, dynamic channel/semi-persistent channel) is scheduled on the panel.

The deactivation method 2 may be at least one of the following deactivation methods 2-1 and 2-2.

[Deactivation Method 2-1]

If the UE does not detect a PDCCH associated with a certain panel within a certain duration, or if the UE does not receive a scheduling grant indicating a PDSCH/PUSCH using the panel within a certain duration, or if the UE does not receive a configuration/activation of a semi-persistent PUCCH transmission associated with the panel within a certain duration, or if the UE does not receive an indication of a dynamic PUCCH transmission associated with the panel within a certain duration, the panel may be deactivated.

A timer defined in the specification or set by RRC signaling may be held for each panel. After the RRC configuration, the timer may start. If the UE detects a PDCCH associated with a certain panel, or if the UE receives a scheduling grant indicating a PDSCH/PUSCH using the panel, or if the UE receives a configuration/activation of a semi-persistent PUCCH transmission associated with the panel, or if the UE receives an indication of a dynamic PUCCH transmission associated with the panel, a timer corresponding to the panel may be restarted.

Figure 14:
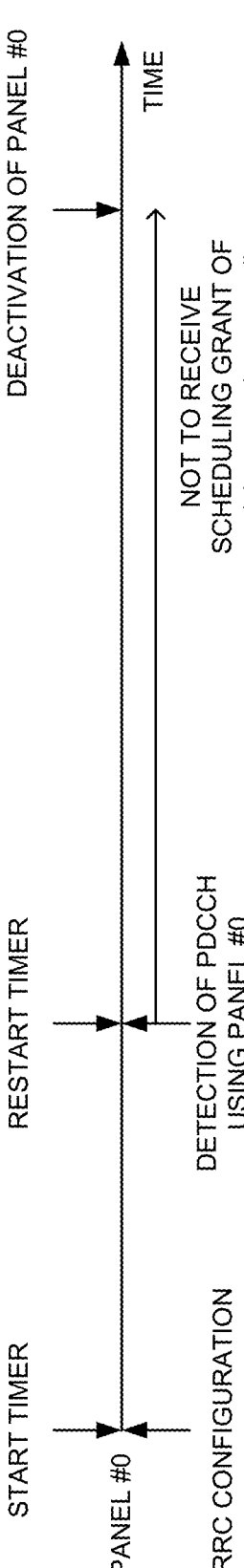
FIG. 14 is a diagram illustrating an example of a deactivation method 2-1.

In the example of FIG. 14, the UE starts a timer corresponding to the panel #0 according to the RRC configuration. Thereafter, when detecting the PDCCH using the panel #0, the UE restarts the timer corresponding to the panel #0. Thereafter, the UE does not detect the PDCCH associated with panel #0, and the panel #0 is deactivated when the timer corresponding to panel #0 expires.

For the PDSCH, the scheduling grant may be DCI for scheduling a dynamic PDSCH or may be activation DCI of semi-persistent scheduling (SPS, DL-SPS).

When the UE receives the activation DCI of the SPS indicating the PDSCH reception using a certain panel, the timer corresponding to the panel may be reset and stopped. When the UE receives the deactivation DCI of the SPS using the panel, the timer corresponding to the panel may be restarted.

In the example of FIG. 15A, the UE starts a timer corresponding to the panel #0 according to the RRC configuration. Thereafter, upon receiving the DCI for scheduling the dynamic PDSCH using panel #0, the UE restarts the timer corresponding to panel #0. Thereafter, the UE does not receive a scheduling grant of the PDSCH using the panel #0, and when the timer corresponding to the panel #0 expires, the panel #0 is deactivated.

In the example of FIG. 15B, the UE starts a timer corresponding to the panel #0 according to the RRC configuration. Thereafter, when the activation of the SPS of the PDSCH using the panel #0 is received, the UE resets and stops the timer corresponding to the panel #0. Thereafter, upon receiving the deactivation of the SPS, the UE starts the timer corresponding to panel #0. Thereafter, a scheduling grant of the PDSCH using the panel #0 is not received, and when the timer corresponding to the panel #0 expires, the panel #0 is deactivated.

For PUSCH, the scheduling grant may be DCI for scheduling the dynamic PUSCH, may be an RRC configuration of a type 1 configuration grant (CG), or may be activation DCI of a type 2 configuration grant.

When the UE receives the CG (configuration of type 1 CG, activation DCI of type 2 CG) indicating the PUSCH transmission using a certain panel, the timer corresponding to the panel may be reset and stopped. When the UE receives the deactivation of the CG using the panel, the timer corresponding to the panel may be restarted.

When the UE receives a configuration/activation of a semi-persistent PUCCH transmission using a certain panel, the timer corresponding to the panel may be reset and stopped.

Deactivation method 2-1 may be supported for one or more (one or more types) channels among the PDCCH, the PDSCH, the PUCCH, and the PUSCH. The timers for the plurality of channels may be held jointly or separately. In a case where the timers for the plurality of channels are held separately, if one or N or all of the timers corresponding to the plurality of channels of a certain panel expire, the panel may be deactivated.

[Deactivation Method 2-2]

If the UE does not schedule a channel on a certain panel in the number of consecutive channels (PDCCH/PDSCH/PUCCH/PUSCH, dynamic channel/semi-persistent channel, specific information), the panel may be deactivated.

If, in a detection (reception) of consecutive k pieces of specific information (consecutive k specific information), the UE does not receive a PDCCH associated with a certain panel, or if the UE does not receive a scheduling grant indicating a PDSCH/PUSCH using the panel, or if the UE does not receive a configuration/activation of a semi-persistent PUCCH transmission associated with the panel, or if the UE does not receive an indication of a dynamic PUCCH transmission associated with the panel, the panel may be deactivated.

The specific information may be a configuration/indication detected by the UE for PDCCH, or scheduling grant of PDSCH/PUSCH, or PUCCH transmission.

Counters of the number of pieces of specific information (the number of specific information) may be held for each panel. At least one of the initial value and the ending value of the counter may be specified in the specification or may be set by RRC signaling.

When specific information that is not associated with a certain panel is detected by the UE, a value of a counter corresponding to the panel may be incremented by one or decremented by one. If specific information associated with the panel is detected by the UE, a counter corresponding to the panel may be reset. If the counter corresponding to the panel reaches the ending value, the panel may be deactivated.

Figure 16:
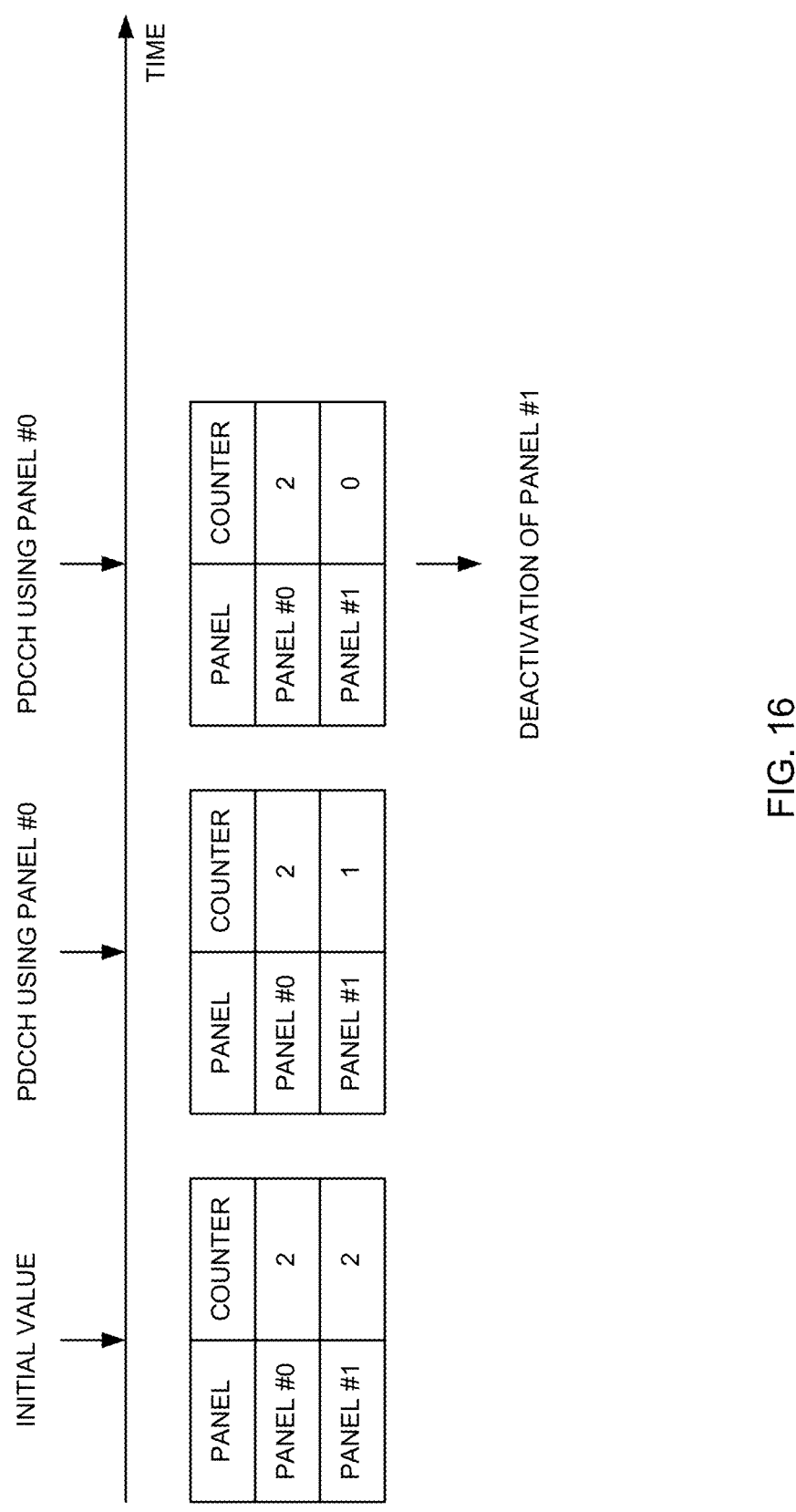
FIG. 16 is a diagram illustrating an example of a deactivation method 2-2.

In the example of FIG. 16, for the counter value k corresponding to each of the panels #0 and #1, the initial value is 2, and the end value is 0. Upon receiving a PDCCH that is not associated with panel #1 (PDCCH associated with the panel #0), the UE decrements the counter value corresponding to the panel #1 by one. When the counter value corresponding to the panel #1 reaches the ending value 0, the UE deactivates the panel #1. When receiving the PDCCH associated with the panel #1, the UE resets the counter value corresponding to the panel to an initial value 2.

For the PDSCH, the scheduling grant may be DCI for scheduling a dynamic PDSCH or may be activation DCI of semi-persistent scheduling (SPS, DL-SPS).

When the UE receives the activation DCI of the SPS indicating the PDSCH reception using a certain panel, the counter corresponding to the panel may be reset to the initial value. Until the UE receives the deactivation DCI of the SPS using the panel, the value of counter corresponding to the panel may remain the same.

When the UE receives the activation DCI of the SPS indicating the PDSCH reception that is not associated with the panel, the value of the counter corresponding to the panel may be incremented by one, may be decremented by one, or may remain the same.

Figure 17:
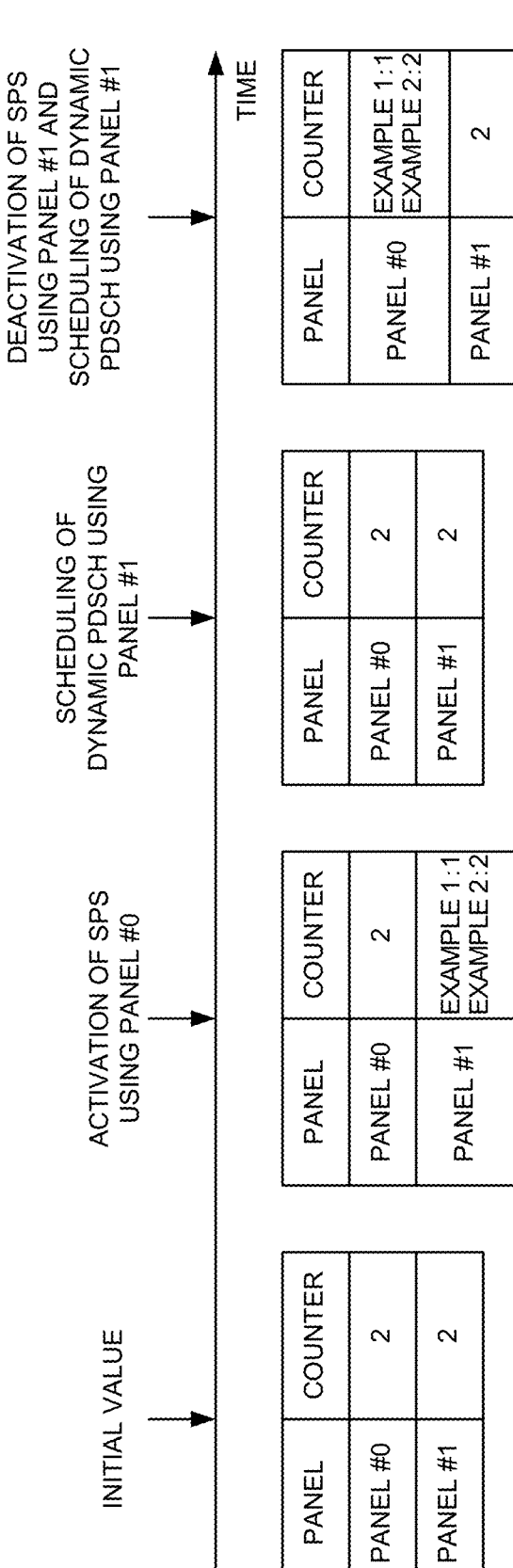
FIG. 17 is a diagram illustrating another example of the deactivation method 2-2.

In the example of FIG. 17, for the counter value corresponding to each of the panels #0 and #1, the initial value is 2, and the end value is 0. Thereafter, when the UE receives the activation of the SPS that is not associated with a certain panel #1 (the activation of the SPS using the panel #0), the UE may decrement the value of the counter corresponding to the panel #1 by one (Example 1) or may keep the value the same (Example 2). In this case, the UE may reset the counter corresponding to the panel #0 to an initial value.

Thereafter, upon receiving the DCI for scheduling the dynamic PDSCH using the panel #1, the UE may reset the counter value corresponding to the panel #1 to an initial value 2. Thereafter, upon receiving the DCI for deactivating the SPS using the panel #1 and scheduling the dynamic PDSCH using the panel #1, the UE may reset the counter value corresponding to the panel #0 to the initial value 2. In this case, the UE may decrement the value of the counter corresponding to the panel #0 by one (Example 1) or may keep the value the same (Example 2).

For PUSCH, the scheduling grant may be DCI for scheduling the dynamic PUSCH, may be an RRC configuration of a type 1 configuration grant (CG), or may be activation DCI of a type 2 configuration grant.

When the UE receives the CG (configuration of type 1 CG, activation DCI of type 2 CG) indicating the PUSCH transmission using a certain panel, the counter corresponding to the panel may be reset to the initial value. Until the UE receives the deactivation of CG using the panel, the value of counter corresponding to the panel may remain the same.

When the UE receives the CG (configuration of type 1 CG, activation DCI of type 2 CG) indicating the PUSCH transmission that is not associated with the panel, the counter value corresponding to the panel may be incremented by one, may be decremented by one, or may remain the same.

When the UE receives a configuration/activation of a semi-persistent PUCCH transmission using a certain panel, the counter corresponding to the panel may be reset to the initial value, and remain the same. When the UE receives a configuration/activation of a semi-persistent PUCCH transmission that is not associated with the panel, the counter value corresponding to the panel may be incremented by one, may be decremented by one, or may remain the same.

Deactivation method 2-2 may be supported for one or more (one or more types) channels among the PDCCH, the PDSCH, the PUCCH, and the PUSCH. The counters for the plurality of channels may be held jointly or separately. In a case where the timers for the plurality of channels are held separately, if one or N or all of the counters corresponding to the plurality of channels of a certain panel reaches the ending value, the panel may be deactivated.

According to a fifth embodiment, the UE can appropriately deactivate the panel.

(Radio Communication System)

Hereinafter, a configuration of a radio communication system according to one embodiment of the present disclosure will be described. In this radio communication system, communication is performed using any one of the radio communication methods according to the embodiments of the present disclosure or a combination thereof.

Figure 18:
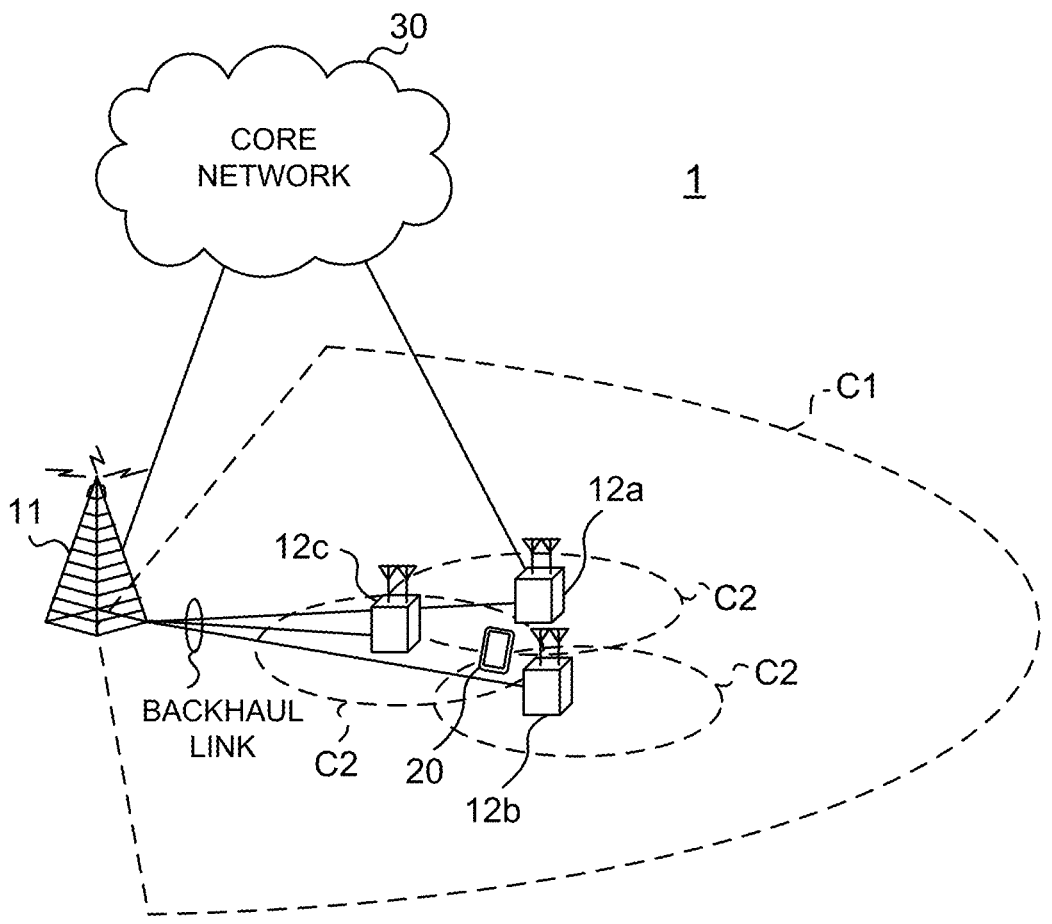
FIG. 18 is a diagram illustrating an example of a schematic configuration of a radio communication system according to an embodiment.

FIG. 18 is a diagram illustrating an example of a schematic configuration of a radio communication system according to an embodiment. A radio communication system 1 may be a system that implements communication using long term evolution (LTE), 5th generation mobile communication system New Radio (5G NR), and the like drafted as the specification by third generation partnership project (3GPP).

Further, the radio communication system 1 may support dual connectivity (multi-RAT dual connectivity (MR-DC)) between a plurality of radio access technologies (RATs). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is MN, and an LTE (E-UTRA) base station (eNB) is SN.

The radio communication system 1 may support dual connectivity between a plurality of base stations in the same RAT (for example, dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are disposed within the macro cell C1 and that form small cells C2 narrower than the macro cell C1. A user terminal 20 may be positioned in at least one cell. The arrangement, number, and the like of cells and the user terminals 20 are not limited to the aspects illustrated in the drawings. Hereinafter the base stations 11 and 12 will be collectively referred to as "base stations 10" when the base stations 11 and 12 are not distinguished from each other.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a first frequency band (frequency range 1 (FR1)) or a second frequency band (frequency range 2 (FR2)). The macro cell C1 may be included in the FR1, and the small cell C2 may be included in the FR2. For example, the FR1 may be a frequency band of 6 GHz or less (sub-6 GHZ), and the FR2 may be a frequency band higher than 24 GHZ (above-24 GHZ). Note that the frequency bands, definitions, and the like of the FR1 and FR2 are not limited thereto, and, for example, the FR1 may correspond to a frequency band higher than the FR2.

Further, the user terminal 20 may perform communication on each CC using at least one of time division duplex (TDD) or frequency division duplex (FDD).

The plurality of base stations 10 may be connected to each other in a wired manner (for example, an optical fiber, an X2 interface, or the like in compliance with common public radio interface (CPRI)) or in a radio manner (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of evolved packet core (EPC), 5G core network (5GCN), next generation core (NGC), or the like.

The user terminal 20 may correspond to at least one of communication methods such as LTE, LTE-A, and 5G.

In the radio communication system 1, a radio access method based on orthogonal frequency division multiplexing (OFDM) may be used. For example, in at least one of downlink (DL) or uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that in the radio communication system 1, another radio access method (for example, another single carrier transmission method or another multi-carrier transmission method) may be used as the UL and DL radio access method.

In the radio communication system 1, a downlink shared channel (physical downlink shared channel (PDSCH)) shared by the user terminals 20, a broadcast channel (physical broadcast channel (PBCH)), a downlink control channel (physical downlink control channel (PDCCH)), and the like may be used as downlink channels.

In the radio communication system 1, an uplink shared channel (physical uplink shared channel (PUSCH)) shared by the user terminals 20, an uplink control channel (physical uplink control channel (PUCCH)), a random access channel (physical random access channel (PRACH)), and the like may be used as uplink channels.

User data, higher layer control information, a system information block (SIB), and the like are transmitted on the PDSCH. User data, higher layer control information, and the like may be transmitted on the PUSCH. Furthermore, a master information block (MIB) may be transmitted on the PBCH.

Lower layer control information may be transmitted on the PDCCH. The lower layer control information may include, for example, downlink control information (DCI) including scheduling information of at least one of the PDSCH and the PUSCH.

Note that DCI that schedules PDSCH may be referred to as DL assignment, DL DCI, or the like, and DCI that schedules PUSCH may be referred to as UL grant, UL DCI, or the like. Note that PDSCH may be replaced with DL data, and PUSCH may be replaced with UL data.

For detection of the PDCCH, a control resource set (CORESET) and a search space may be used. The CORESET corresponds to a resource that searches for DCI. The search space corresponds to a search area and a search method for PDCCH candidates. One CORESET may be associated with one or more search spaces. UE may monitor CORESET associated with a certain search space based on search space configuration.

One search space may correspond to a PDCCH candidate corresponding to one or more aggregation levels. One or more search spaces may be referred to as a search space set. Note that "search space", "search space set", "search space configuration", "search space set configuration", "CORESET", "CORESET configuration", and the like in the present disclosure may be replaced with each other.

Uplink control information (UCI) including at least one of channel state information (CSI), delivery acknowledgement information (which may be referred to as, for example, hybrid automatic repeat request acknowledgement (HARQ-ACK), ACK/NACK, or the like), or scheduling request (SR) may be transmitted on the PUCCH. A random access preamble for establishing connection with a cell may be transmitted on the PRACH.

Note that in the present disclosure, downlink, uplink, and the like may be expressed without "link". Various channels may be expressed without adding "physical" at the beginning thereof.

In the radio communication system 1, a synchronization signal (SS), a downlink reference signal (DL-RS), and the like may be transmitted. In the radio communication system 1, a cell-specific reference signal (CRS), a channel state information reference signal (CSI-RS), a demodulation reference signal (DMRS), a positioning reference signal (PRS), a phase tracking reference signal (PTRS), or the like may be transmitted as the DL-RS.

The synchronization signal may be, for example, at least one of a primary synchronization signal (PSS) or a secondary synchronization signal (SSS). A signal block including the SS (PSS or SSS) and the PBCH (and the DMRS for the PBCH) may be referred to as an SS/PBCH block, an SS block (SSB), or the like. Note that, the SS, the SSB, or the like may also be referred to as a reference signal.

Furthermore, in the radio communication system 1, a measurement reference signal (sounding reference signal (SRS)), a demodulation reference signal (DMRS), or the like may be transmitted as an uplink reference signal (UL-RS). Note that, DMRSs may be referred to as "user terminal-specific reference signals (UE-specific Reference Signals)".

(Base Station)

Figure 19:
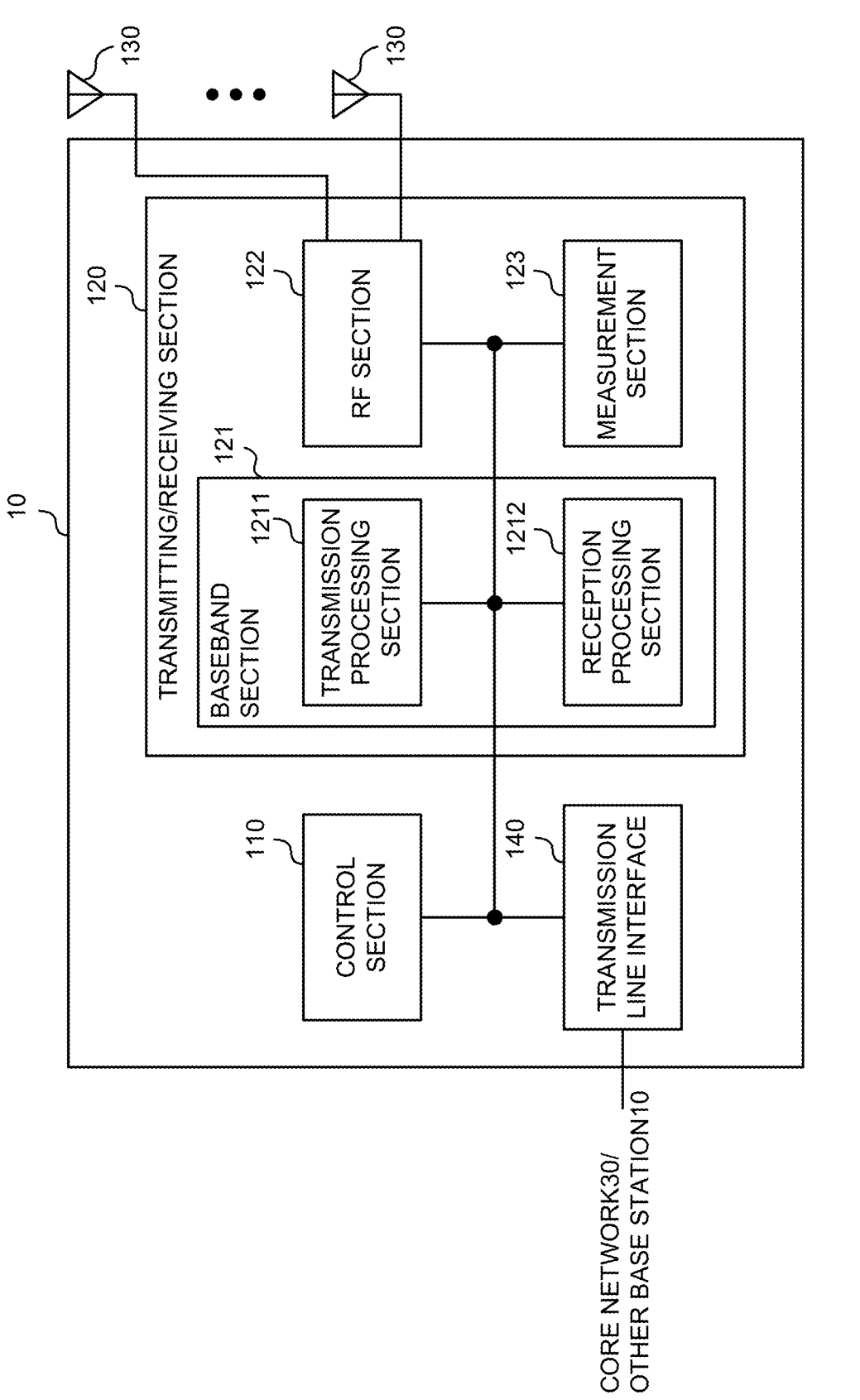
FIG. 19 is a diagram illustrating an example of a configuration of a base station according to an embodiment.

FIG. 19 is a diagram illustrating an example of a configuration of a base station according to an embodiment. The base station 10 includes a control section 110, a transmitting/receiving section 120, a transmission/reception antenna 130, and a transmission line interface 140. Note that one or more of the control sections 110, one or more of the transmitting/receiving sections 120, one or more of the transmission/reception antennas 130, and one or more of the transmission line interfaces 140 may be included.

Note that this example mainly describes a functional block which is a characteristic part of the present embodiment, and it may be assumed that the base station 10 also has another functional block necessary for radio communication. A part of processing of each section described below may be omitted.

The control section 110 controls the entire base station 10. The control section 110 can be constituted by a controller, a control circuit, or the like, which is described based on common recognition in the technical field to which the present disclosure relates.

The control section 110 may control signal generation, scheduling (for example, resource allocation or mapping), and the like. The control section 110 may control transmission/reception, measurement, and the like using the transmitting/receiving section 120, the transmission/reception antenna 130, and the transmission line interface 140. The control section 110 may generate data to be transmitted as a signal, control information, a sequence, and the like, and may forward the data, the control information, the sequence, and the like to the transmitting/receiving section 120. The control section 110 may perform call processing (such as configuration or releasing) of a communication channel, management of the state of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can be constituted by a transmitter/receiver, an RF circuit, a baseband circuit, a filter, a phase shifter, a measurement circuit, a transmission/reception circuit, and the like, which are described based on common recognition in the technical field to which the present disclosure relates.

The transmitting/receiving section 120 may be constituted as an integrated transmitting/receiving section, or may be constituted by a transmitting section and a receiving section. The transmitting section may include the transmission processing section 1211 and the RF section 122. The receiving section may be constituted by the reception processing section 1212, the RF section 122, and the measurement section 123.

The transmission/reception antenna 130 can be constituted by an antenna described based on common recognition in the technical field to which the present disclosure relates, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a transmission beam (Tx beam) or a reception beam using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like on, for example, data, control information, and the like acquired from the control section 110, to generate a bit string to be transmitted.

The transmitting/receiving section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog conversion on the bit string to be transmitted, to output a baseband signal.

The transmitting/receiving section 120 (RF section 122) may perform modulation to a radio frequency band, filtering processing, amplification, and the like on the baseband signal, and may transmit a signal in the radio frequency band via the transmission/reception antenna 130.

Meanwhile, the transmitting/receiving section 120 (RF section 122) may perform amplification, filtering processing, demodulation to a baseband signal, and the like on the signal in the radio frequency band received by the transmission/reception antenna 130.

The transmitting/receiving section 120 (reception processing section 1212) may apply reception processing such as analog-digital conversion, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 120 (measurement section 123) may perform measurement on the received signal. For example, the measurement section 123 may perform radio resource management (RRM) measurement, channel state information (CSI) measurement, and the like based on the received signal. The measurement section 123 may measure received power (for example, reference signal received power (RSRP)), received quality (for example, reference signal received quality (RSRQ), a signal to interference plus noise ratio (SINR), a signal to noise ratio (SNR)), signal strength (for example, received signal strength indicator (RSSI)), propagation path information (for example, CSI), and the like. The measurement result may be output to the control section 110.

The transmission line interface 140 may transmit/receive a signal (backhaul signaling) to and from an apparatus included in the core network 30, other base stations 10, and the like, and may acquire, transmit, and the like user data (user plane data), control plane data, and the like for the user terminal 20.

Note that, the transmitting section and the receiving section of the base station 10 in the present disclosure may include at least one of the transmitting/receiving section 120, the transmission/reception antenna 130, and the transmission line interface 140.

The control section 110 may schedule transmission or reception of the specific signal using one of the plurality of panels of the terminal 20. The transmitting/receiving section 120 may transmit information (for example, at least one of RRC signaling, MAC CE, and DCI) regarding activation or deactivation of at least one of the plurality of panels.

The control section 110 may determine activation or deactivation of one panel among a plurality of panels of the terminal. The transmitting/receiving section 120 may transmit information (for example, at least one of RRC signaling, MAC CE, and DCI) regarding to association between the specific signal and any of the plurality of panels on the basis of the determination.

(User Terminal)

Figure 20:
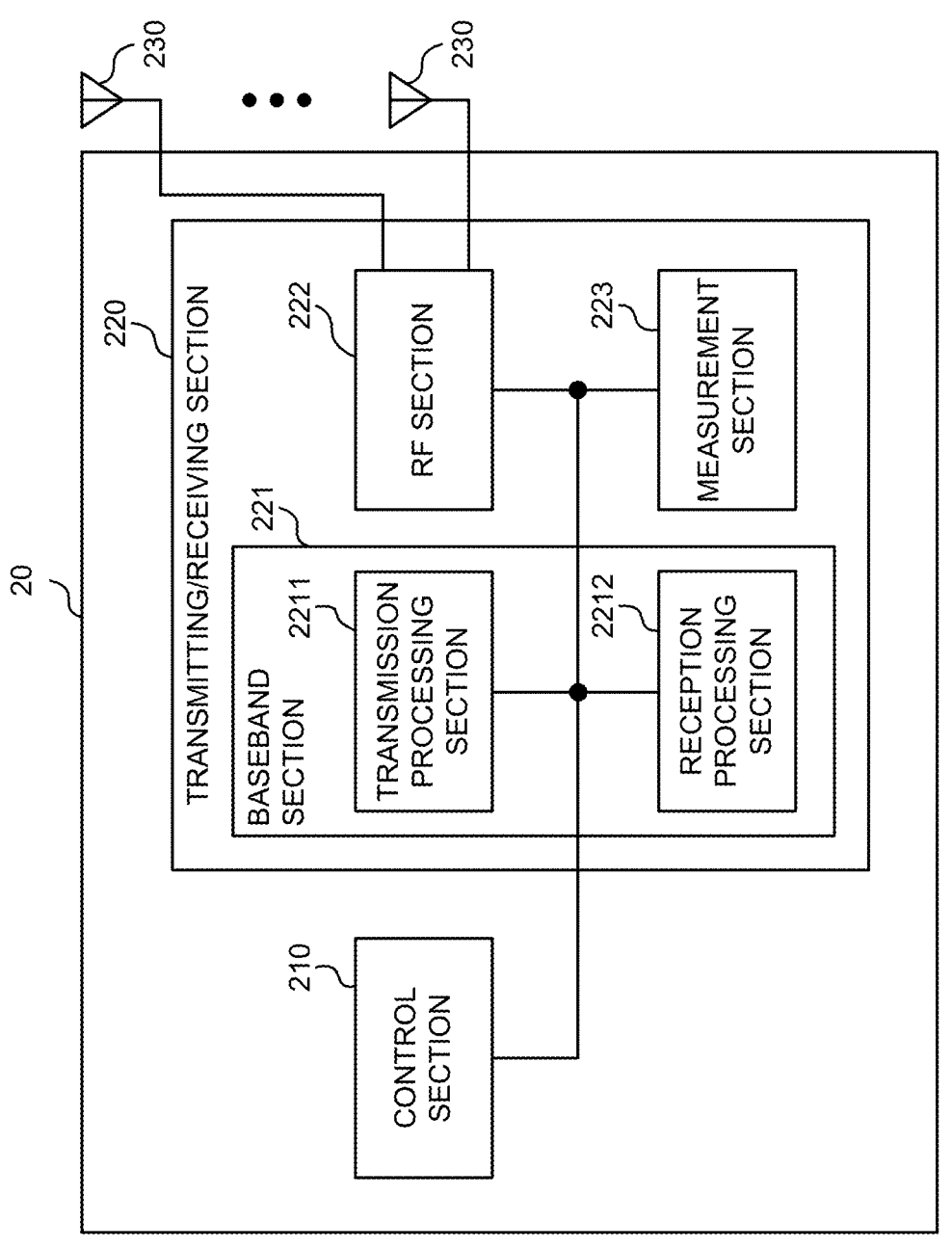
FIG. 20 is a diagram illustrating an example of a configuration of a user terminal according to an embodiment.

FIG. 20 is a diagram illustrating an example of a configuration of a user terminal according to an embodiment. The user terminal 20 includes a control section 210, a transmitting/receiving section 220, and a transmission/reception antenna 230. Note that one or more of the control sections 210, one or more of the transmitting/receiving sections 220, and one or more of the transmission/reception antennas 230 may be included.

Note that, although this example mainly describes functional blocks of a characteristic part of the present embodiment, it may be assumed that the user terminal 20 includes other functional blocks that are necessary for radio communication as well. A part of processing of each section described below may be omitted.

The control section 210 controls the entire user terminal 20. The control section 210 can include a controller, a control circuit, and the like that are described on the basis of common recognition in the technical field related to the present disclosure.

The control section 210 may control signal generation, mapping, and the like. The control section 210 may control transmission/reception, measurement, and the like using the transmitting/receiving section 220 and the transmission/reception antenna 230. The control section 210 may generate data to be transmitted as a signal, control information, a sequence, and the like, and may transfer the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can include a transmitter/receiver, an RF circuit, a baseband circuit, a filter, a phase shifter, a measurement circuit, a transmission/reception circuit, and the like that are described on the basis of common recognition in the technical field related to the present disclosure.

The transmitting/receiving section 220 may be formed as an integrated transmitting/receiving section, or may include a transmitting section and a receiving section. The transmitting section may include the transmission processing section

2211 and the RF section 222. The receiving section may be configured by the reception processing section 2212, the RF section 222, and the measurement section 223.

The transmission/reception antenna 230 can include an antenna that is described on the basis of common recognition in the technical field related to the present disclosure, for example, an array antenna or the like.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a transmission beam and a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like, for example, on data, control information, and the like acquired from the control section 210, to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog conversion on the bit string to be transmitted, to output a baseband signal.

Note that whether or not to apply DFT processing may be determined based on configuration of transform precoding. In a case where transform precoding is enabled for a certain channel (for example, PUSCH), the transmitting/receiving section 220 (transmission processing section 2211) may perform DFT processing as the transmission processing in order to transmit the channel using a DFT-s-OFDM waveform. In a case where it is not the case, DFT processing need not be performed as the transmission processing.

The transmitting/receiving section 220 (RF section 222) may perform modulation to a radio frequency range, filtering processing, amplification, and the like on the baseband signal, to transmit a signal in the radio frequency range via the transmission/reception antenna 230.

Meanwhile, the transmitting/receiving section 220 (RF section 222) may perform amplification, filtering processing, demodulation to a baseband signal, and the like on the signal in the radio frequency range received by the transmission/reception antenna 230.

The transmitting/receiving section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal to acquire user data and the like.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may include at least one of the transmitting/receiving section 220 or the transmission/reception antenna 230.

The transmitting/receiving section 220 may receive information (for example, at least one of RRC signaling, MAC CE, and DCI) regarding activation or deactivation of at least one of the plurality of panels. The control section 210 may use one of the plurality of panels for transmission or reception of the specific signal on the basis of the information.

The information may include at least one of an identifier corresponding to a panel, a serving cell identifier, and a bandwidth part (BWP) identifier.

The information may indicate an association between a panel and a specific signal.

The control section 210 may support transmitting or receiving specific signals using a deactivated panel.

The transmitting/receiving section 220 may receive information (for example, at least one of RRC signaling, MAC CE, and DCI) regarding to association between the specific signal and any of the plurality of panels. The control section 210 may perform activation or deactivation of one panel among the plurality of panels on the basis of the information.

The information may associate one of a control resource set for the specific signal, a transmission setting indication (TCI) state for the specific signal, a resource for the specific signal, a resource set for the specific signal, and a spatial relation for the specific signal with any of a plurality of panels.

When the information indicates an association between the specific signal and the one panel, the control section 210 may activate the one panel.

When the information does not indicate an association between the specific signal and the one panel, or when a timer corresponding to the one panel expires, or when a counter corresponding to the one panel reaches an end value, the control section 210 may deactivate the one panel.

(Hardware Configuration)

Note that the block diagrams that have been used to describe the above embodiments illustrate blocks in functional units. These functional blocks (components) may be implemented in arbitrary combinations of at least one of hardware and software. Further, the method for implementing each functional block is not particularly limited. That is, each functional block may be implemented by a single apparatus physically or logically aggregated, or may be implemented by directly or indirectly connecting two or more physically or logically separate apparatuses (in a wired manner, a radio manner, or the like, for example) and using these apparatuses. The functional block may be achieved by combining the one device or the plurality of devices with software.

Here, the function includes, but is not limited to, determining, determining, judging, calculating, computing, processing, deriving, investigating, searching, ascertaining, receiving, transmitting, outputting, accessing, solving, selecting, choosing, establishing, comparing, assuming, expecting, regarding, broadcasting, notifying, communicating, forwarding, configuring, reconfiguring, allocating, mapping, assigning, and the like. For example, a functional block (component) that has a transmission function may be referred to as a transmitting section (transmitting unit), a transmitter, and the like. In any case, as described above, the implementation method is not particularly limited.

Figure 21:
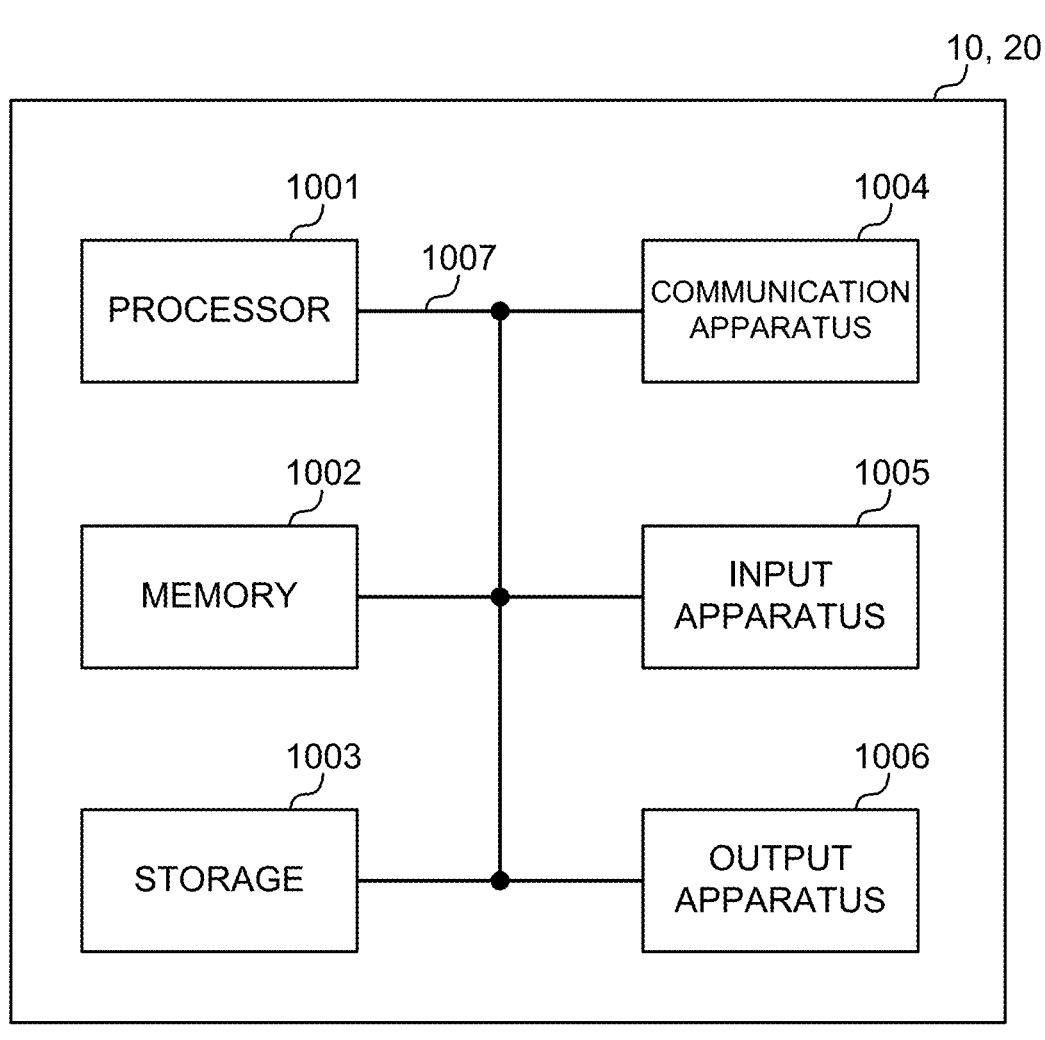
FIG. 21 is a diagram illustrating an example of a hardware configuration of the base station and the user terminal according to an embodiment.

For example, the base station, the user terminal, or the like according to one embodiment of the present disclosure may function as a computer that executes the processing of the radio communication method in the present disclosure. FIG. 21 is a diagram illustrating an example of a hardware configuration of the base station and the user terminal according to an embodiment. Physically, the above-described base station 10 and user terminal 20 may be configured as a computer apparatus that includes a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, a device, a section, or a unit can be replaced with each other. The hardware configuration of the base station 10 and the user terminal 20 may be designed to include one or more of the apparatuses illustrated in the drawings, or may be designed not to include some apparatuses.

For example, although only one processor 1001 is shown, a plurality of processors may be provided. Further, the processing may be executed by one processor, or the processing may be executed by two or more processors simultaneously or sequentially, or using other methods. Note that the processor 1001 may be implemented with one or more chips.

Each of functions of the base station 10 and the user terminal 20 is, for example, implemented by causing given software (program) to be read on hardware such as the processor 1001 or the memory 1002 to thereby cause the processor 1001 to perform operation, control communication via the communication apparatus 1004, and control at least one of reading and writing of data from or in the memory 1002 and the storage 1003.

The processor 1001 may control the whole computer by, for example, running an operating system. The processor 1001 may be configured by a central processing unit (CPU) including an interface with peripheral equipment, a control apparatus, an operation apparatus, a register, and the like. For example, at least a part of the above-described control section 110 (210), transmitting/receiving section 120 (220), and the like may be implemented by the processor 1001.

Furthermore, the processor 1001 reads programs (program code), software modules, data, and so on from at least one of the storage 1003 and the communication apparatus 1004 into the memory 1002, and executes various types of processing according to these. As the program, a program that causes a computer to execute at least a part of the operation described in the above-described embodiment is used. For example, the control section 110 (210) may be implemented by a control program that is stored in the memory 1002 and operates in the processor 1001, and another functional block may be implemented similarly.

The memory 1002 is a computer-readable recording medium, and may include, for example, at least one of a read only memory (ROM), an erasable programmable ROM (EPROM), an electrically EPROM (EEPROM), a random access memory (RAM), and other appropriate storage media. The memory 1002 may be referred to as a register, a cache, a main memory (primary storage apparatus), and the like. The memory 1002 may store a program (program code), a software module, and the like executable for implementing the radio communication method according to an embodiment of the present disclosure.

The storage 1003 is a computer-readable recording medium, and may include, for example, at least one of a flexible disk, a floppy (registered trademark) disk, a magneto-optical disk (for example, a compact disc ROM (CD-ROM) and the like), a digital versatile disk, a Blu-ray (registered trademark) disk), a removable disk, a hard disk drive, a smart card, a flash memory device (for example, a card, a stick, or a key drive), a magnetic stripe, a database, a server, or other appropriate storage media. The storage 1003 may be referred to as "secondary storage apparatus".

The communication apparatus 1004 is hardware (transmitting/receiving device) for performing inter-computer communication via at least one of a wired network and a wireless network, and for example, is referred to as network device, network controller, network card, communication module, and the like. The communication apparatus 1004 may include a high frequency switch, a duplexer, a filter, a frequency synthesizer, and the like in order to implement, for example, at least one of frequency division duplex (FDD) and time division duplex (TDD). For example, the transmitting/receiving section 120 (220), the transmission/reception antenna 130 (230), and the like described above may be implemented by the communication apparatus 1004. The transmitting/receiving section 120 (220) may be implemented by physically or logically separating the transmitting section 120*a* (220*a*) and the receiving section 120*b* (220*b*) from each other.

The input apparatus 1005 is an input device for receiving input from the outside (for example, a keyboard, a mouse, a microphone, a switch, a button, a sensor and so on). The output apparatus 1006 is an output device that performs output to the outside (for example, a display, a speaker, a light emitting diode (LED) lamp, or the like). Note that the input apparatus 1005 and the output apparatus 1006 may be provided in an integrated structure (for example, a touch panel).

Furthermore, these pieces of apparatus (these apparatus), including the processor 1001, the memory 1002 and so on are connected by the bus 1007 so as to communicate information. The bus 1007 may be formed with a single bus, or may be formed with buses that vary between pieces of apparatus.

Further, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by the hardware. For example, the processor 1001 may be implemented with at least one of these pieces of hardware (these hardware).

(Variations)

Note that terms described in the present disclosure and terms necessary for understanding the present disclosure may be replaced with terms that have the same or similar meanings. For example, a channel, a symbol, and a signal (signal or signaling) may be replaced interchangeably. Further, the signal may be a message. The reference signal can be abbreviated as an RS, and may be referred to as a pilot, a pilot signal, and the like, depending on which standard applies. Further, a component carrier (CC) may be referred to as a cell, a frequency carrier, a carrier frequency, and the like.

A radio frame may be formed with one or more durations (frames) in the time domain. Each of the one or more periods (frames) included in the radio frame may be referred to as a subframe. Further, the subframe may include one or more slots in the time domain. A subframe may be a fixed time duration (for example, 1 ms) that is not dependent on numerology.

Here, the numerology may be a communication parameter used for at least one of transmission and reception of a certain signal or channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing performed by a transceiver in the frequency domain, specific windowing processing performed by a transceiver in the time domain, or the like.

The slot may include one or more symbols in the time domain (orthogonal frequency division multiplexing (OFDM) symbols, single carrier frequency division multiple access (SC-FDMA) symbols, and the like). Also, a slot may be a time unit based on numerology.

A slot may include a plurality of mini slots. Each mini slot may include one or more symbols in the time domain. Further, the mini slot may be referred to as a sub slot. Each mini slot may include fewer symbols than the slot. A PDSCH (or PUSCH) transmitted in a time unit larger than the mini slot may be referred to as PDSCH (PUSCH) mapping type A. A PDSCH (or PUSCH) transmitted using the mini slot may be referred to as PDSCH (PUSCH) mapping type B.

A radio frame, a subframe, a slot, a minislot and a symbol all represent the time unit in signal communication. The radio frame, the subframe, the slot, the mini slot, and the symbol may be called by other applicable names, respectively. Note that time units such as a frame, a subframe, a slot, a mini slot, and a symbol in the present disclosure may be replaced with each other.

For example, one subframe may be referred to as TTI, a plurality of consecutive subframes may be referred to as TTI, or one slot or one mini slot may be referred to as TTI. That is, at least one of the subframe and the TTI may be a subframe (1 ms) in the existing LTE, may be a period shorter than 1 ms (for example, one to thirteen symbols), or may be a period longer than 1 ms. Note that the unit to represent the TTI may be referred to as a "slot," a "mini slot" and so on, instead of a "subframe".

Here, a TTI refers to the minimum time unit of scheduling in radio communication, for example. For example, in the LTE system, a base station performs scheduling to allocate radio resources (frequency bandwidth, transmission power, and the like that can be used in each user terminal) to each user terminal in TTI units. Note that the definition of TTIs is not limited to this.

The TTI may be the transmission time unit of channel-encoded data packets (transport blocks), code blocks, codewords, and so on, or may be the unit of processing in scheduling, link adaptation, and so on. Note that when TTI is given, a time interval (for example, the number of symbols) in which the transport blocks, the code blocks, the codewords, and the like are actually mapped may be shorter than TTI.

Note that, when one slot or one minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

TTI having a period of 1 ms may be referred to as usual TTI (TTI in 3GPP Rel. 8 to 12), normal TTI, long TTI, a usual subframe, a normal subframe, a long subframe, a slot, or the like. A TTI that is shorter than the usual TTI may be referred to as "shortened TTI", "short TTI", "partial TTI" (or "fractional TTI"), "shortened subframe", "short subframe", "mini slot", "sub-slot", "slot", or the like.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or more contiguous subcarriers in the frequency domain. The number of subcarriers included in the RB may be the same regardless of the numerology, and may be twelve, for example. The number of subcarriers included in the RB may be determined based on numerology.

Also, an RB may include one or more symbols in the time domain, and may be one slot, one minislot, one subframe or one TTI in length. One TTI, one subframe, and the like may be each formed with one or more resource blocks.

Note that one or more RBs may be referred to as a physical resource block (PRB), a subcarrier group (SCG), a resource element group (REG), a PRB pair, an RB pair, and the like.

Furthermore, a resource block may include one or more resource elements (REs). For example, one RE may be a radio resource field of one subcarrier and one symbol.

A bandwidth part (BWP) (which may be referred to as a partial bandwidth or the like) may represent a subset of contiguous common resource blocks (RBs) for a certain numerology in a certain carrier. Here, the common RB may be specified by the index of the RB based on a common reference point of the carrier. The PRB may be defined in a BWP and numbered within that BWP.

The BWP may include a BWP for UL (UL BWP) and a BWP for DL (DL BWP). For the UE, one or more BWPs may be configured within one carrier.

At least one of the configured BWPs may be active, and the UE does not need to be assumed to transmit or receive a given signal/channel outside the active BWP. Note that, a "cell", a "carrier", and the like in the present disclosure may be replaced with a BWP.

Note that the structures of radio frames, subframes, slots, minislots, symbols and so on described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the length of cyclic prefix (CP), and the like can be variously changed.

Furthermore, the information and parameters described in the present disclosure may be represented in absolute values, represented in relative values with respect to given values, or represented using other corresponding information. For example, a radio resource may be specified by a given index.

The names used for parameters and so on in the present disclosure are in no respect limiting. Further, any mathematical expression or the like that uses these parameters may differ from those explicitly disclosed in the present disclosure. Since various channels (PUCCH, PDCCH, and the like) and information elements can be identified by any suitable names, various names assigned to these various channels and information elements are not restrictive names in any respect.

The information, signals, and the like described in the present disclosure may be represented using any of various different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Further, information, signals, and the like can be output in at least one of a direction from higher layers to lower layers and a direction from lower layers to higher layers. Information, signals and so on may be input and output via a plurality of network nodes.

The information, signals and so on that are input and/or output may be stored in a specific location (for example, in a memory), or may be managed in a control table. The information, signals, and the like to be input and output can be overwritten, updated, or appended. The output information, signals, and the like may be deleted. The information, signals and so on that are input may be transmitted to other pieces of apparatus (other apparatus).

Notification of information may be performed not only using the aspects/embodiments described in the present disclosure but also using another method. For example, the notification of information in the present disclosure may be performed using physical layer signaling (for example, downlink control information (DCI) or uplink control information (UCI)), higher layer signaling (for example, radio resource control (RRC) signaling, broadcast information (master information block (MIB)), system information block (SIB), or the like), or medium access control (MAC) signaling), another signal, or a combination thereof.

Note that the physical layer signaling may be referred to as Layer 1/Layer 2 (L1/L2) control information (L1/L2 control signal), L1 control information (L1 control signal), and the like. Further, the RRC signaling may be referred to as an RRC message, and may be, for example, an RRC connection setup message, an RRC connection reconfiguration message, and the like. Further, notification of the MAC signaling may be performed using, for example, an MAC control element (CE).

Also, reporting of given information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a given value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server, or another remote source by using at least one of a wired technology (coaxial cable, optical fiber cable, twisted pair, digital subscriber line (DSL), or the like) and a wireless technology (infrared rays, microwaves, and the like), at least one of the wired technology and the wireless technology is included within the definition of a transmission medium.

The terms "system" and "network" used in the present disclosure may be used interchangeably. The "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmission power", "phase rotation", "antenna port", "antenna port group", "layer", "number of layers", "rank", "resource", "resource set", "resource group", "beam", "beam width", "beam angle", "antenna", "antenna element", and "panel" can be used interchangeably.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or more (for example, three) cells. In a case where the base station accommodates a plurality of cells, the entire coverage area of the base station can be partitioned into a plurality of smaller areas, and each smaller area can provide communication services through a base station subsystem (for example, small base station for indoors (remote radio head (RRH))). The term "cell" or "sector" refers to a part or the whole of a coverage area of at least one of a base station and a base station subsystem that performs a communication service in this coverage.

In the present disclosure, the terms such as "mobile station (MS)", "user terminal", "user equipment (UE)", and "terminal" can be used interchangeably.

A mobile station may be referred to as a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of the base station and the mobile station may be referred to as a transmitting apparatus, a receiving apparatus, a radio communication apparatus, and the like. Note that at least one of the base station and the mobile station may be a device mounted on a moving object, a moving object itself, and the like. The moving object may be a transportation (for example, a car, an airplane, or the like), an unmanned moving object (for example, a drone, an autonomous car, or the like), or a (manned or unmanned) robot. Note that at least one of the base station and the mobile station also includes an apparatus that does not necessarily move during a communication operation. For example, at least one of the base station and the mobile station may be an Internet of Things (IoT) device such as a sensor.

Further, the base station in the present disclosure may be replaced with the user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In this case, the user terminal 20 may have the function of the above-described base station 10. Further, terms such as "uplink" and "downlink" may be replaced with terms corresponding to communication between terminals (for example, "side"). For example, an uplink channel and a downlink channel may be replaced with a side channel.

Likewise, the user terminal in the present disclosure may be replaced with a base station. In this case, the base station 10 may be configured to have the functions of the user terminal 20 described above.

In the present disclosure, an operation performed by a base station may be performed by an upper node thereof in some cases. In a network including one or more network nodes with base stations, it is clear that various operations performed for communication with a terminal can be performed by a base station, one or more network nodes (examples of which include but are not limited to mobility management entity (MME) and serving-gateway (S-GW)) other than the base station, or a combination thereof.

Each aspect/embodiment described in the present disclosure may be used alone, used in a combination, and switched in association with execution. Further, the order of processing procedures, sequences, flowcharts, and the like of the aspects/embodiments described in the present disclosure may be re-ordered as long as there is no inconsistency. For example, regarding the methods described in the present disclosure, elements of various steps are presented using an illustrative order, but are not limited to the presented specific order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), 6th generation mobile communication system (6G), xth generation mobile communication system (xG) (x is, for example, an integer or decimal), future radio access (FRA), new radio access technology (RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded on the basis of these, and the like. Further, a plurality of systems may be combined and applied (for example, a combination of LTE or LTE-A and 5G, and the like).

The term "on the basis of" used in the present disclosure does not mean "only on the basis of" unless otherwise specified. In other words, the phrase "based on" means both "based only on" and "based at least on".

Reference to elements with designations such as "first", "second", and so on as used in the present disclosure does not generally limit the number/quantity or order of these elements. These designations can be used in the present disclosure, as a convenient way of distinguishing between two or more elements. In this way, reference to the first and second elements does not imply that only two elements may be employed, or that the first element must precede the second element in some way.

The terms "judging (determining)" as used in the present disclosure may encompass a wide variety of operations. For example, "judging (determining)" may be interpreted to mean making judgements and determinations related to judging, calculating, computing, processing, deriving, investigating, looking up, search, inquiry (for example, looking up in a table, database, or another data structure), ascertaining, and so on.

Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on.

In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

In addition, to "judge (determine)" may be replaced with "assuming", "expecting", "considering", and so on. The "maximum transmission power" described in the present disclosure may mean a maximum value of transmission power, nominal UE maximum transmit power, or rated UE maximum transmit power.

As used in the present disclosure, the terms "connected" and "coupled", or any variation of these terms mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be replaced with "access".

As used in the present disclosure, when two elements are connected, these elements may be considered "connected" or "coupled" to each other by using one or more electrical wires, cables, printed electrical connections, and the like, and, as a number of non-limiting and non-inclusive examples, by using electromagnetic energy having wavelengths in the radio frequency domain, microwave, and optical (both visible and invisible) regions, or the like.

In the present disclosure, the phrase "A and B are different" may mean "A and B are different from each other". Note that the phrase may mean that "A and B are different from C". The terms such as "leave", "coupled", and the like may be interpreted as "different".

When the terms such as "include", "including", and variations of these are used in the present disclosure, these terms are intended to be inclusive, in a manner similar to the way the term "comprising" is used. Furthermore, the term "or" as used in the present disclosure is intended to be not an exclusive-OR.

In the present disclosure, for example, when translations add articles, such as a, an, and the in English, the present disclosure may include that the noun that follows these articles is in the plural.

Now, although the invention according to the present disclosure has been described in detail above, it is obvious to a person skilled in the art that the invention according to the present disclosure is by no means limited to the embodiments described in the present disclosure. The invention according to the present disclosure can be embodied with various corrections and in various modified aspects, without departing from the spirit and scope of the invention defined based on the description of claims. Consequently, the description of the present disclosure is provided only for the purpose of explaining examples, and should by no means be construed to limit the invention according to the present disclosure in any way.

The invention claimed is:

1. A terminal comprising:

a receiver that receives a first downlink control information (DCI) for scheduling a first Physical Uplink Shared Channel (PUSCH) and receives a second DCI for scheduling a second PUSCH; and a processor that controls, based on the first DCI and the second DCI, simultaneous transmission of the first PUSCH and the second PUSCH by using a first panel and a second panel, wherein when group-based beam reporting is configured, each of the first panel and the second panel corresponds to each respective group of the group-based beam reporting.

2. The terminal according to claim 1, wherein a first sounding reference signal (SRS) resource set and a second SRS resource set are configured in the terminal, and the processor is indicated by the first DCI with a first SRS resource within the first SRS resource set and is indicated by the second DCI with a second SRS resource within the second SRS resource set.

3. A radio communication method of a terminal, the method comprising:

receiving a first downlink control information (DCI) for scheduling a first Physical Uplink Shared Channel (PUSCH) and receiving a second DCI for scheduling a second PUSCH; and controlling, based on the first DCI and the second DCI, simultaneous transmission of the first PUSCH and the second PUSCH by using a first panel and a second panel, wherein when group-based beam reporting is configured, each of the first panel and the second panel corresponds to each respective group of the group-based beam reporting.

4. A base station comprising:

a transmitter that transmits a first downlink control information (DCI) for scheduling a first Physical Uplink Shared Channel (PUSCH) and transmits a second DCI for scheduling a second PUSCH; and a processor that controls, based on the first DCI and the second DCI, reception of the first PUSCH and the second PUSCH that are simultaneously transmitted by using a first panel and a second panel, wherein when group-based beam reporting is configured, each of the first panel and the second panel corresponds to each respective group of the group-based beam reporting.

5. A system comprising a terminal and a base station, wherein the terminal comprises:

a receiver that receives a first downlink control information (DCI) for scheduling a first Physical Uplink Shared Channel (PUSCH) and receives a second DCI for scheduling a second PUSCH; and a processor that controls, based on the first DCI and the second DCI, simultaneous transmission of the first PUSCH and the second PUSCH by using a first panel and a second panel, wherein when group-based beam reporting is configured, each of the first panel and the second panel corresponds to each respective group of the group-based beam reporting, and the base station comprises:

a processor that controls reception of the first PUSCH and the second PUSCH.

* * * * *